United States Patent
Wang

(10) Patent No.: US 12,413,717 B2
(45) Date of Patent: Sep. 9, 2025

(54) INTRA PREDICTION METHOD, CODER, DECODER, AND CODING AND DECODING SYSTEM

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/616,608

(22) Filed: Mar. 26, 2024

(65) Prior Publication Data
US 2024/0236309 A1     Jul. 11, 2024

Related U.S. Application Data

(63) Continuation of application No. PCT/CN2021/121045, filed on Sep. 27, 2021.

(51) Int. Cl.
*H04N 19/11* (2014.01)
*H04N 19/176* (2014.01)
*H04N 19/593* (2014.01)

(52) U.S. Cl.
CPC .......... *H04N 19/11* (2014.11); *H04N 19/176* (2014.11); *H04N 19/593* (2014.11)

(58) Field of Classification Search
CPC .... H04N 19/176; H04N 19/593; H04N 19/11; H04N 19/105; H04N 19/70; H04N 19/159; H04N 19/119; H04N 19/132; H04N 19/186

USPC .......................................................... 375/240
See application file for complete search history.

(56) References Cited

U.S. PATENT DOCUMENTS

| | | | |
|---|---|---|---|
| 2019/0166370 A1 | 5/2019 | Xiu | |
| 2019/0215531 A1* | 7/2019 | Lee | ...................... H04N 19/577 |
| 2020/0137386 A1 | 4/2020 | Zhao | |
| 2021/0266547 A1 | 8/2021 | Zhao | |

(Continued)

FOREIGN PATENT DOCUMENTS

| CN | 110809888 A | 2/2020 |
|---|---|---|
| CN | 112449180 A | 3/2021 |

(Continued)

OTHER PUBLICATIONS

Yang et al (Title: EE2-2.1: Results for template-based intra mode derivation using MPMs, Joint Video Experts Team (JVET) of ITU-T SG 16 WP 3 and ISO/IEC JTC 1/SC 29 23rd Meeting, by teleconference, Jul. 7-16, 2021) (Year: 2021).*

(Continued)

*Primary Examiner* — Masum Billah
(74) *Attorney, Agent, or Firm* — BAYES PLLC

(57) ABSTRACT

An intra prediction method, an encoder, and a decoder are provided. In the method, after determining the weights of at least two prediction modes on at least two units in a current block, the rate of change of a weight in a certain direction can be determined further according to the weights of the at least two units, and according to the rate of change, the weights on other units on the current block can then be determined by means of a smooth transition to determine an intra prediction value of the current block.

20 Claims, 11 Drawing Sheets

| Sub-template 1 | | | Sub-template 2 | Sub-template 3 |
|---|---|---|---|---|
| | Sub-block 0 | Sub-block 1 | Sub-template 1 | Sub-block 0 | Sub-block 1 |
| Sub-template 0 | Sub-block 2 | Sub-block 3 | Sub-template 0 | Sub-block 2 | Sub-block 3 |

(56) References Cited

U.S. PATENT DOCUMENTS

2021/0266587 A1    8/2021  Liu
2021/0274214 A1    9/2021  Moon

FOREIGN PATENT DOCUMENTS

| CN | 112543323 A | 3/2021 |
|---|---|---|
| CN | 113302918 A | 8/2021 |
| WO | 2017192995 A1 | 11/2017 |

OTHER PUBLICATIONS

Keming Cao et al. (Title: EE2-related: Fusion for template-based intra mode derivation, Joint Video Experts Team (JVET) of ITU-T SG 16 WP 3 and ISO/IEC JTC 1/SC 29 23rd Meeting, by teleconference, Jul. 7-16, 2021) (Year: 2021).*

Wang, Yang et al, "EE2-related: Template-based intra mode derivation using MPMs", Joint Video Experts Team (JVET) of ITU-T SG 16 WP 3 and ISO/IEC JTC 1/SC 29 22nd Meeting, by teleconference, JVET-V0098-v2, Apr. 20-28, 2021, pp. 2. 4 pages.

Zhao, Jie et al, "EE2-Related: Improvements of Decoder-Side Intra Mode Derivation", Joint Video Experts Team (JVET) of ITU-T SG 16 WP 3 and ISO/IEC JTC 1/SC 29 22nd Meeting, by teleconference, JVET-V0087, Apr. 20-28, 2021, entire document. 6 pages.

International Search Report in the international application No. PCT/CN2021/121045, mailed on Jun. 23, 2022. 7 pages with English translation.

Written Opinion of the International Search Authority in the international application No. PCT/CN2021/121045, mailed on Jun. 23, 2022. 6 pages with English translation.

* cited by examiner

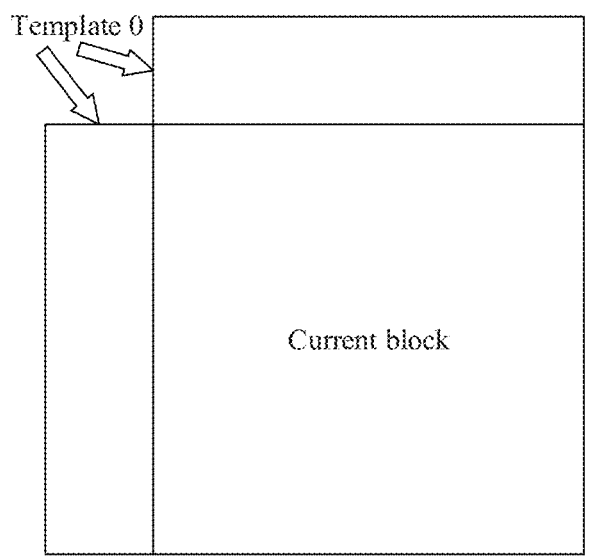
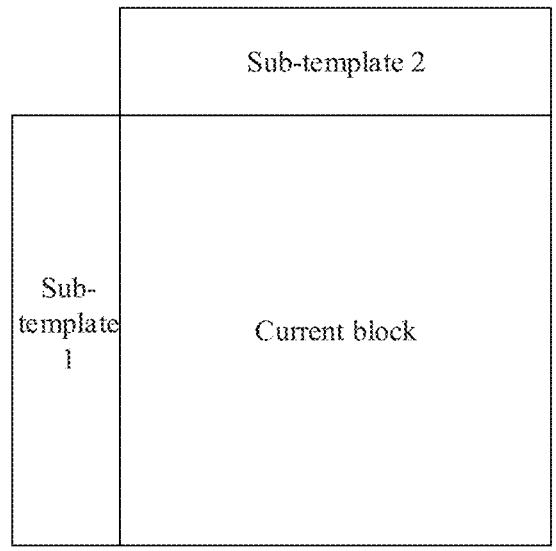
FIG. 10

INTRA PREDICTION METHOD, CODER, DECODER, AND CODING AND DECODING SYSTEM

CROSS-REFERENCE TO RELATED APPLICATION

This is a continuation application of International Patent Application No. PCT/CN2021/121045, filed on Sep. 27, 2021, the contents of which are hereby incorporated by reference in their entirety.

BACKGROUND

With the improvement of requirement for video display quality among people, new video applications such as high-definition and ultra-high-definition video came into being. H.265/High Efficiency Video Coding (HEVC) has been unable to meet the rapid development of video applications. Joint Video Exploration Team (JVET) proposed the next generation video coding standard H.266/Versatile Video Coding (VVC).

In the H.266/VVC, the template-based intra mode derivation (TIMD) solution uses the correlation between the template and the current block, and uses the prediction effect of the intra prediction mode on the template to estimate the prediction effect of the intra prediction mode on the current block, and finally chooses one or two modes with the minimum cost as the prediction mode of the current block. However, the accuracy of the prediction effect of the TIMD solution needs to be further improved.

SUMMARY

The embodiments of the present disclosure provide a method for intra prediction, an encoder, a decoder and a codec system. The different weights are set for different units of a current block, so that the intra prediction value of the current block can be more accurately determined, thereby improving the compression efficiency.

Embodiments of the present disclosure relate to the field of video encoding and decoding, and in particular to a method for intra prediction, an encoder, a decoder and a codec system.

In the first aspect, a method for intra prediction is provided. The method is applied to a decoder, and includes the following operations.

A prediction mode parameter of a current block is acquired. The prediction mode parameter indicates that a template-based intra mode derivation (TIMD) is used to determine an intra prediction value of the current block.

First weights of at least two prediction modes on a first unit of the current block are determined, respectively; and second weights of the at least two prediction modes on a second unit of the current block are determined, respectively. Coordinates of the first unit and coordinates of the second unit are different in a first direction.

First change rates of the at least two prediction modes in the first direction are determined based on the first weights, the second weights, the coordinates of the first unit and the coordinates of the second unit.

Fourth weights of the at least two prediction modes on a fourth unit are determined based on the first change rates and coordinates of the fourth unit.

The intra prediction value of the current block is determined based on the first weights, the second weights and the fourth weights.

In the second aspect, a method for intra prediction is provided. The method is applied to an encoder, and includes the following operations.

A prediction mode parameter of a current block is acquired. The prediction mode parameter indicates that a TIMD is used to determine an intra prediction value of the current block.

First weights of at least two prediction modes on a first unit of the current block are determined, respectively; and second weights of the at least two prediction modes on a second unit of the current block are determined, respectively. Coordinates of the first unit and coordinates of the second unit are different in a first direction.

First change rates of the at least two prediction modes in the first direction are determined based on the first weights, the second weights, the coordinates of the first unit and the coordinates of the second unit.

Fourth weights of the at least two prediction modes on a fourth unit are determined based on the first change rates and coordinates of the fourth unit.

The intra prediction value of the current block is determined based on the first weights, the second weights and the fourth weights.

In the third aspect, a decoder is provided. The decoder includes a processor and a memory. The memory is configured to store computer programs, and the processor is configured to:
acquire a prediction mode parameter of a current block. The prediction mode parameter indicates that a TIMD is used to determine an intra prediction value of the current block;
determine first weights of at least two prediction modes on a first unit of the current block, respectively; and determine second weights of the at least two prediction modes on a second unit of the current block, respectively. Coordinates of the first unit and coordinates of the second unit are different in a first direction.

The processor is further configured to determine first change rates of the at least two prediction modes in the first direction based on the first weights, the second weights, the coordinates of the first unit and the coordinates of the second unit.

The processor is further configured to determine fourth weights of the at least two prediction modes on a fourth unit based on the first change rates and coordinates of the fourth unit.

The processor is further configured to determine the intra prediction value of the current block based on the first weights, the second weights and the fourth weights.

BRIEF DESCRIPTION OF THE DRAWINGS

FIG. 9A to FIG. 9B are specific examples of sub-blocks according to an embodiment of the present disclosure.

FIG. 10 is specific examples of sub-templates according to an embodiment of the present disclosure.

DETAILED DESCRIPTION

The technical solutions in the embodiments of the present disclosure will be described below with reference to the drawings in the embodiments of the present disclosure.

The present disclosure is applied to the field of video encoding and decoding. Firstly, a codec framework applicable to the embodiments of the present disclosure will be described with reference to FIG. 1 and FIG. 2. The codec framework is a block-based hybrid coding framework adopted by the current unified video encoding and decoding standards.

Figure 1:
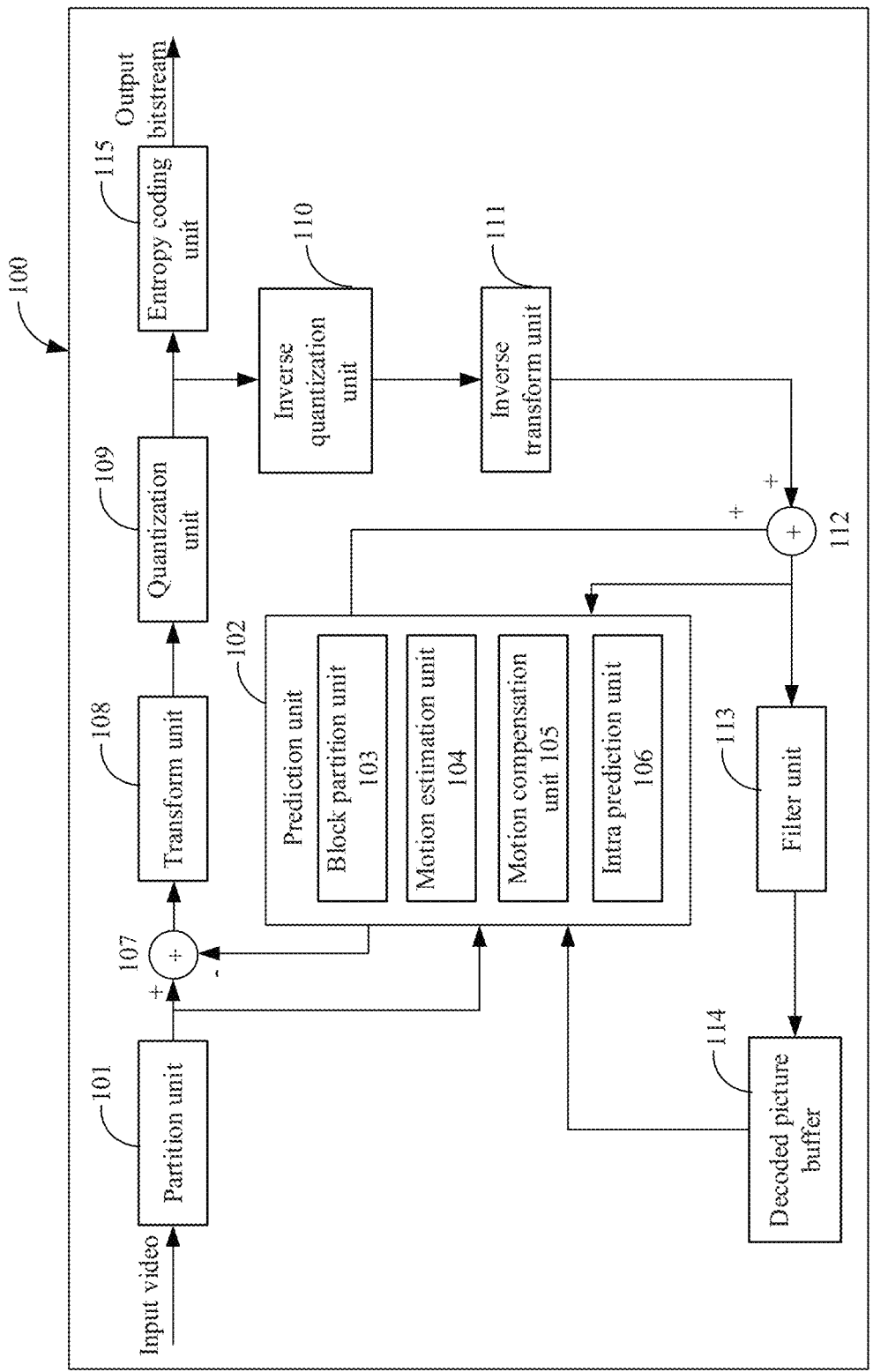
FIG. 1 is a schematic block diagram of an encoder according to an embodiment of the present disclosure.

FIG. 1 is a schematic block diagram of an encoder 100 according to an embodiment of the present disclosure. As illustrated in FIG. 1, the encoder 100 may include a partition unit 101, a prediction unit 102, a first adder 107, a transform unit 108, a quantization unit 109, an inverse quantization unit 110, an inverse transform unit 111, a second adder 112, a filter unit 113, a decoded picture buffer (DPB) unit 114, and an entropy coding unit 115.

The partition unit 101 partitions a picture in an input video into one or more coding tree units (CTUs) or largest coding units (LCUs) of squares of the same size. Exemplarily, the size of the CTU or LCU is 128×128, or 64×64 pixels. The partition unit 101 partitions the picture into multiple tiles, and may further partition a tile into one or more bricks. The one tile or one brick may include one or more complete and/or partial CTUs or LCUs. In addition, the partition unit 101 may form one or more slices. One slice may include one or more tiles arranged in grid order in the picture or one or more tiles covering rectangular regions in the picture. The partition unit 101 may further form one or more sub-pictures. One sub-picture may include one or more slices, tiles or bricks.

In the encoder 100, the partition unit 101 transfers the CTUs or LCUs to the prediction unit 102. Typically, the prediction unit 102 may be composed of a block partition unit 103, a motion estimation (ME) unit 104, a motion compensation (MC) unit 105, and an intra prediction unit 106. The ME unit 104 and the MC unit 105 may constitute an inter prediction unit.

Specifically, the block partition unit 103 may further partition the input CTU or LCT into smaller Coding Units (CUs). The CU may further be partitioned into prediction units (PUs) and so on, which is not limited in the present disclosure.

The prediction unit 102 may acquire an inter prediction block of the current block (for example, CU or PU or the like) by using the ME unit 104 and the MC unit 105. The intra prediction unit 106 may acquire an intra prediction block of the current block by using various intra prediction modes including the TIMD mode.

Because there is a strong correlation between neighbouring pixels in a frame in a video, the intra prediction method used in video encoding and decoding technology can help to eliminate spatial redundancy between neighbouring pixels. Because there is a strong similarity between neighbouring frames in a video, the inter prediction method used in video encoding and decoding technology can help to eliminate temporal redundancy between neighbouring frames, thereby improving the coding efficiency.

The prediction unit 102 outputs a prediction block of the current block. The first adder 107 calculates a difference (i.e., a residual block) between the current block in the output of the partition unit 101 and the prediction block of the current block. The transform unit 108 reads the residual block and performs one or more transform operations on the residual block to acquire coefficients. The quantization unit 109 quantizes the coefficients and outputs the quantization coefficients (i.e., levels). The inverse quantization unit 110 performs a scaling operation on the quantization coefficients to output the reconstructed coefficients. The inverse transform unit 111 performs one or more inverse transforms corresponding to the transform(s) in the transform unit 108 and outputs a residual block. The second adder 112 calculates a reconstructed block by adding the residual block and the prediction block of the current block from the prediction unit 102. The second adder 112 transmits its output to the prediction unit 102 for use as an intra prediction reference. After all the blocks in the picture are reconstructed, the filter unit 113 performs in-loop filtering on the reconstructed picture.

The output of the filter unit 113 is decoded pictures. The decoded pictures are buffered to the DPB unit 114. The DPB unit 114 outputs the decoded pictures according to timing and control information. The pictures stored in the DPB unit 114 may also be used as references for the prediction unit 102 to perform inter prediction or intra prediction. Finally, the entropy coding unit 115 signals parameters (such as, block partition information, prediction, transform, quantization, entropy coding, in-loop filtering and other mode information or parameter information, etc.) necessary for decoding the picture from the encoder 100 into the bitstream. That is, the encoder 100 finally outputs the bitstream.

Further, the encoder 100 may be a memory having a processor and including computer programs. When the processor reads and runs the computer programs, the encoder 100 reads the input video and generates a corresponding bitstream. In addition, the encoder 100 may also be a computing device having one or more chips. These units implemented as integrated circuits on the chip have similar connection and data exchange functions to corresponding units in FIG. 1.

Figure 2:
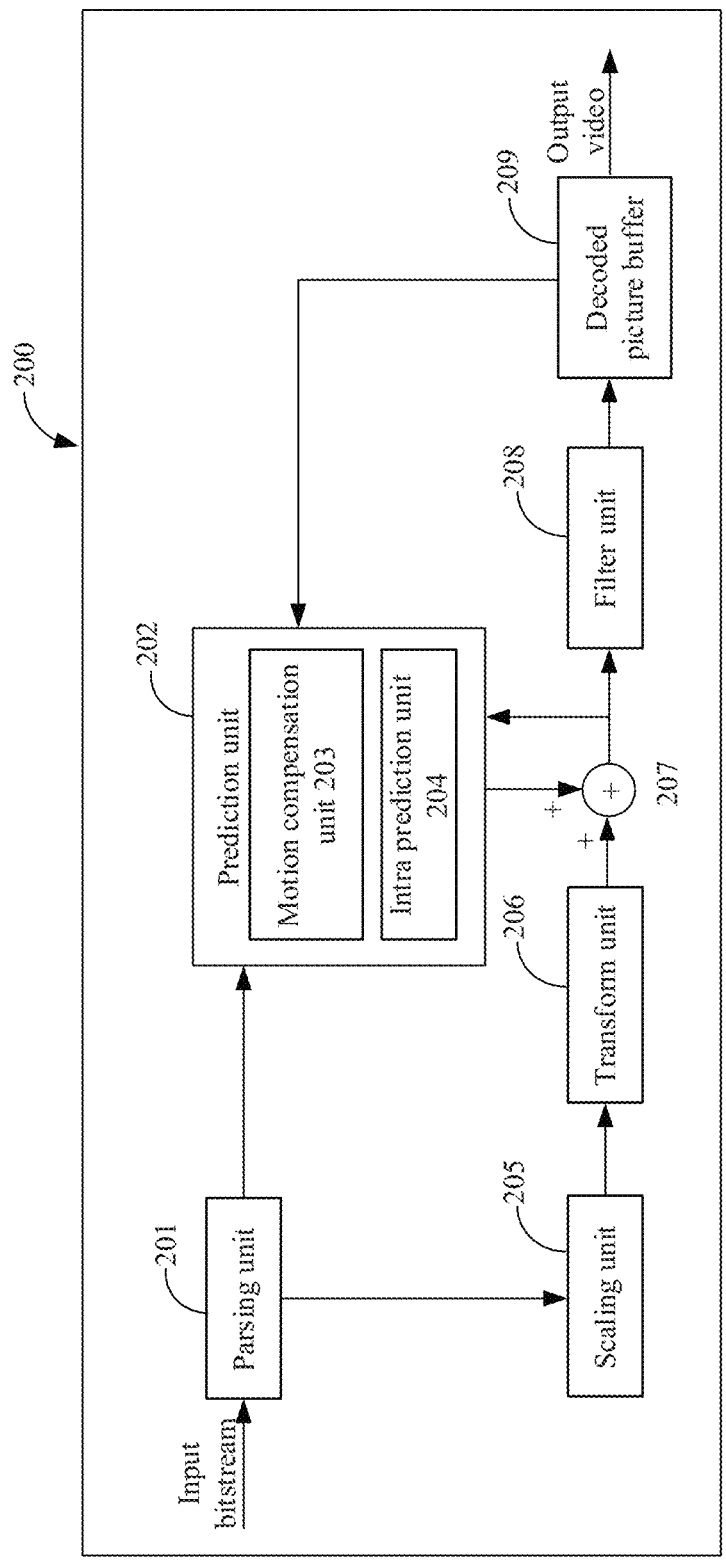
FIG. 2 is a schematic block diagram of a decoder according to an embodiment of the present disclosure.

FIG. 2 is a schematic block diagram of a decoder 200 according to an embodiment of the present disclosure. As illustrated in FIG. 2, the decoder 200 may include a parsing unit 201, a prediction unit 202, a scaling unit 205, a transform unit 206, an adder 207, a filter unit 208 and a decoded picture buffer unit 209.

The input bitstream of the decoder 200 may be the bitstream output by the encoder 100. The parsing unit 201 parses the input bitstream (for example, performing parsing based on existing information), and determines block partition information, mode information (prediction, transform, quantization, entropy coding, in-loop filtering, etc.) or parameter information that are the same as those of the encoding end, thereby ensuring that the reconstructed picture acquired by the encoding end is the same as the decoded picture acquired by the decoding end. The parsing unit 201 transmits the acquired mode information or parameter information to units in the decoder 200.

The prediction unit 202 determines a prediction block of a current coding block (for example, CU or PU, etc.). The prediction unit 202 may include a motion compensation unit 203 and an intra prediction unit 204. Specifically, when it is indicated that the inter decoding mode is used for decoding the current coding block, the prediction unit 202 transmits the relevant parameters from the parsing unit 201 to the motion compensation unit 203 to acquire the inter prediction block. When it is indicated that the intra prediction mode (including a TIMD flag-based TIMD mode) is used for decoding the current coding block, the prediction unit 202 transmits the relevant parameters from the parsing unit 201 to the intra prediction unit 204 to acquire the intra prediction block.

The scaling unit 205 has the same function as the inverse quantization unit 110 in the encoder 100. The scaling unit 205 performs a scaling operation on the quantization coefficients (i.e., levels) from the parsing unit 201 to acquire reconstructed coefficients. The transform unit 206 has the same function as the inverse transform unit 111 in the encoder 100. The transform unit 206 performs one or more transform operations (i.e., inverse operation(s) of the one or more transform operations performed by the inverse transform unit 111 in the encoder 100) to acquire a residual block.

The adder 207 performs an add operation on its inputs (the prediction block from the prediction unit 202 and the residual block from the transform unit 206) to acquire a reconstructed block of the current coding block. The reconstructed block is further transmitted to the prediction unit 202 to be used as a reference for other blocks encoded in the intra prediction mode.

After all blocks in the picture are reconstructed, the filter unit 208 performs in-loop filtering on the reconstructed picture. The output of the filter unit 208 is decoded pictures, and the decoded pictures are buffered to the DPB 209. The DPB 209 outputs the decoded pictures according to timing and control information. The pictures stored in the DPB 209 may also be used as references for the prediction unit 202 to perform inter prediction or intra prediction.

Further, the decoder 200 may be a memory having a processor and including computer programs. When the processor reads and runs the computer programs, the decoder 200 reads the input bitstream and generates a corresponding decoded video. In addition, the decoder 200 may also be a computing device having one or more chips. These units implemented as integrated circuits on the chip have similar connection and data exchange functions to the corresponding units in FIG. 2.

It should be noted that the basic flows of a video codec under a block-based hybrid coding framework has been described above in combination with FIG. 1 or FIG. 2, and the codec framework or basic flows are only used to illustrate the embodiments of the present disclosure, which are not used to limit the present disclosure. For example, with the development of technology, some modules or operations of the framework or flows may be optimized. In the specific implementation, the technical solutions according to the embodiments of the present disclosure may be flexibly applied according to the actual needs.

In the embodiments of the present disclosure, the current block refers to the current coding unit CU, the current prediction unit PU, or other coding blocks, which is not limited in the present disclosure.

Figure 3:
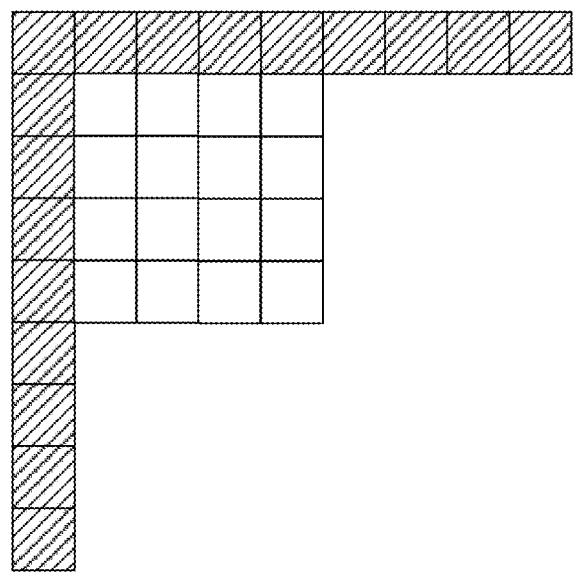
FIG. 3 is an example of predicting a current block by using reconstructed pixels as reference pixels.

Exemplarily, in the intra prediction unit 106 of the encoder 100 or the intra prediction unit 204 of the decoder 200, the current block may be predicted by using reconstructed pixels that have been encoded around the current block (for example, pixels in the reconstructed picture described above) as reference pixels. FIG. 3 illustrates an example of predicting a current block by using reconstructed pixels as reference pixels. As illustrated in FIG. 3, a 4×4 block filled with white is the current block, and the pixels filled with shadow in the left row and the upper column of the current block are the reference pixels of the current block. The intra prediction unit predicts the current block by using these reference pixels. In some embodiments, the reference pixels may already be all available, that is, all the reference pixels have been encoded and decoded. In other embodiments, the reference pixels may be partially unavailable, for example, if the current block is in the leftmost part of the entire frame, then the reference pixels in the left of the current block are unavailable. Alternatively, when the current block is encoded and decoded, the left-bottom portion of the current block has not been encoded and decoded, so the left-bottom reference pixels are unavailable. In the case where the reference pixels are unavailable, the filling may be performed by using the available reference pixels, certain values or certain methods, or the filling may not be performed, which is not limited in the present disclosure. In some embodiments, a Multiple reference line (MRL) intra prediction method may be used, that is, more reference pixels are used to improve coding efficiency.

There are many prediction modes for intra prediction. For example, in H.264, 9 modes (mode 0 to mode 8) may be used for intra prediction of 4×4 block. The mode 0 is used for copying the pixels in the top of the current block to the current block in the numerical direction as prediction values; the mode 1 is used for copying the left reference pixels to the current block in the horizontal direction as the prediction values; the mode 2 (Direct current (DC) mode) takes the average value of 8 points A to D and I to L as the prediction value of all points, and Modes 3 to 8 are used for copying the reference pixels to the corresponding positions of the current block in a certain angle respectively. Because some positions of the current block do not correspond exactly to the reference pixels, it may be necessary to use the weighted average value of the reference pixels, or sub-pixels of interpolated reference pixels.

Figure 4:
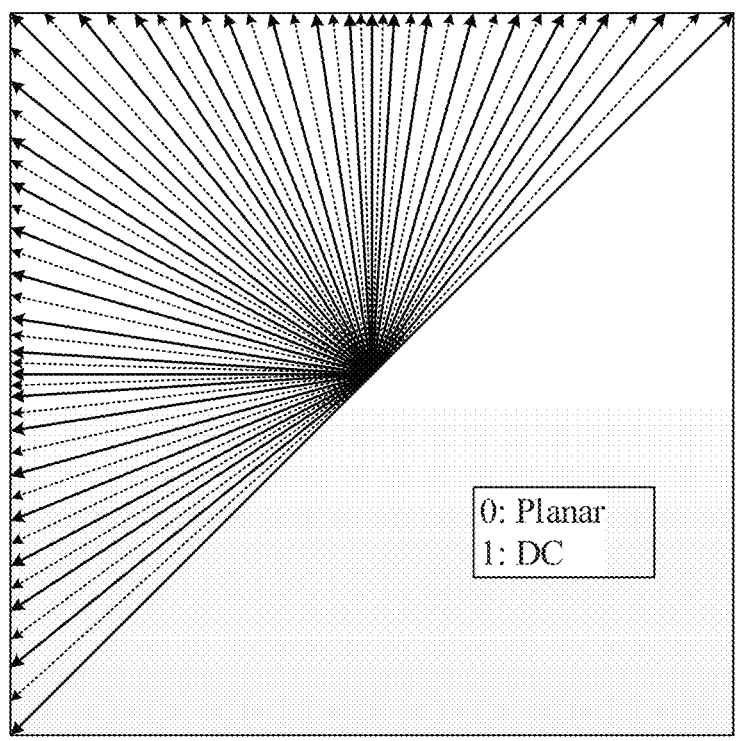
FIG. 4 is an example of an intra prediction mode.
Figure 5:
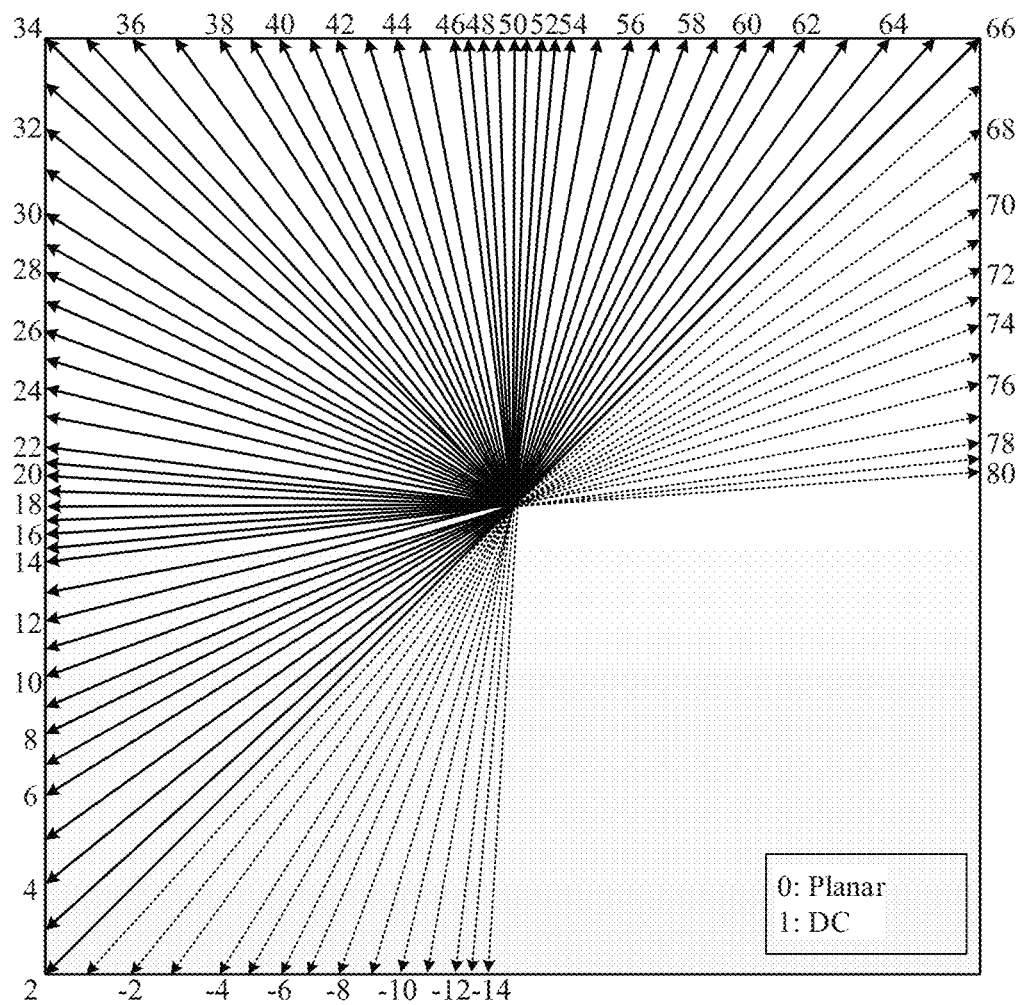
FIG. 5 is another example of an intra prediction mode.

In addition, there are Plane, Planar and other modes. With the development of technology and the expansion of blocks, there are more and more angular prediction modes. For example, the intra prediction modes used by HEVC include a total of 35 prediction modes including Planar, DC and 33 angle modes. For another example, as illustrated in FIG. 4, the intra prediction modes used by VVC include 67 intra prediction modes, among which there are 65 angular prediction modes except Mode 0 (Planar) and Mode 1 (DC). The planar mode is usually used for processing gradient textures, the DC mode is usually used for processing flat regions, and angular intra prediction mode is usually used for blocks with obvious angular texture. The angular prediction tiles reference pixels to the current block at a specified angle as prediction values. Of course, the VVC may also use a wide-angle prediction mode for non-square blocks. The wide-angle prediction mode makes the predicted angle range larger than the angle range of square block. As illustrated in FIG. 5, 2 to 66 are angles corresponding to prediction modes of square blocks, and −1 to −14 and 67 to 80 represent the extended angles in the wide-angle prediction mode. It should be noted that the described here is the prediction mode of a single component, such as the prediction mode of a single component, i.e., Y component. Because of the introduction of cross-component prediction in the VVC, that is, the correlation between channels are used, U and V components may be predicted by using the reconstructed value of Y component in the same block. These cross-component prediction modes are not included in the above modes.

In some embodiments, the decoder may determine the intra prediction mode used by the current block based on some flag information. In order to reduce the overhead of these flag information in the bitstream, the most probable mode (MPM) is introduced. The decoder may derive some MPMs according to the correlation between blocks. Because MPM is more likely to be selected, it is generally possible to use shorter codewords to represent descriptions in the MPM and use longer codewords to represent non-MPM mode. The MPM usually uses the mode(s) used by neighbouring blocks, such as the description used by the left neighouring block or the top neighouring block. Because of the spatial correlation, the modes used by neighbouring blocks may also be used by the current block. In addition, modes related to the modes of these neighbouring blocks may be such as modes with similar angles (for example, subtle texture changes between the current block and neighouring block occur). Also, the most commonly used modes, such as planar mode.

Figure 6:
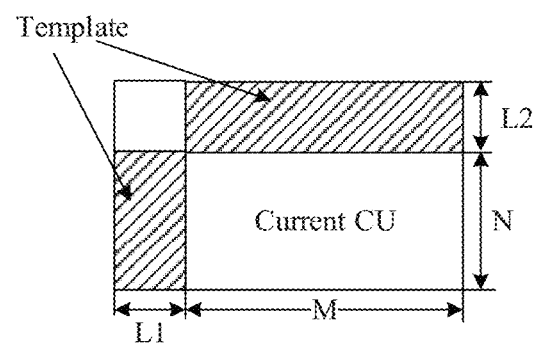
FIG. 6 is a schematic diagram of the current CU and the templates of the TIMD method.

In view of this, the TIMD method is proposed. FIG. 6 illustrates a schematic diagram of the current CU and template of the TIMD method. As illustrated in FIG. 6, templates may be set on the left and top of the current CU. The regions of the templates have been decoded. For example, the size of the current CU is M*N, the size of the template on the left side of the current CU is L1*N, and the size of the template on the top side of the current CU is M*L2. Because the templates and the current CU are neighbouring, and there is a certain correlation among the templates and the current CU. Therefore, the prediction effect of an intra prediction mode on the template may be used to estimate the prediction effect of the intra prediction mode on the current CU. In other words, if a prediction mode has a good prediction effect on the template, it is very likely that it will have a good prediction effect on the current CU.

The TIMD may determine one or two prediction modes for intra prediction of the current block. Exemplarily, when two prediction modes are selected, the prediction values of the two prediction modes may be weighted according to a certain proportion (i.e., a weight) to obtain an intra prediction value of the current block. However, the current TIMD technology sets the same weight for each point of the current block. For the picture with complex textures, the prediction effects of two prediction modes for different positions in the current block may be different. For example, one mode has a good prediction effect for the left side of the current block, but has a bad prediction effect for the right side of the current block; while the other mode has a good prediction effect for the right side of the current block, but has a bad prediction effect for the left side of the current block. Therefore, a solution is urgently needed to improve the accuracy of intra prediction.

In view of this, the embodiments of the present disclosure provide a method for intra prediction. The template of the current block is partitioned into sub-templates, the weights of at least two prediction modes on units (such as sub-blocks, portions or pixels, etc.) in the current block are determined based on the sub-templates, and further the intra prediction value of the current block is determined based on the weights of the at least two prediction modes on units of the current block. Since the embodiments of the present disclosure can determine the weights of at least two prediction modes on different units of the current block, respectively, so that different weights can be set for different position points in the current block, thus the embodiments of the present disclosure are helpful to more accurately determine the intra prediction value of the current block, thereby improving the compression efficiency.

Figure 7:
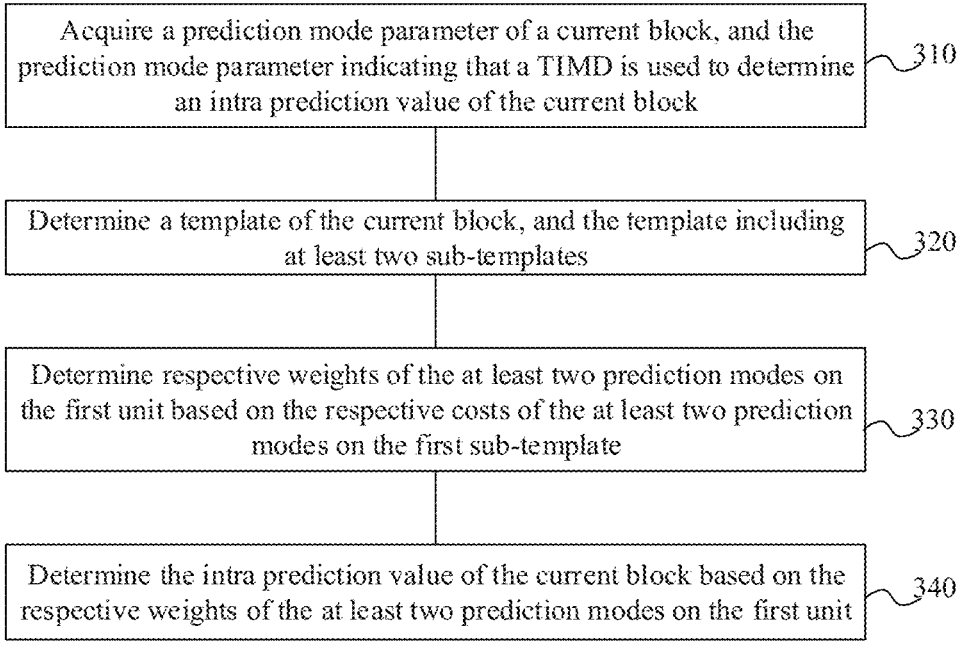
FIG. 7 is a schematic flowchart of a method for intra prediction according to an embodiment of the present disclosure.

FIG. 7 illustrates a schematic flowchart of a method 300 for intra prediction according to an embodiment of the present disclosure. The method 300 may be applied to an encoder (such as encoder 100 in FIG. 1) or to a decoder (such as decoder 200 in FIG. 2). Further the method 300 may be applied to the intra prediction unit 106 in the encoder 100 or the intra prediction unit 204 in the decoder 200. As illustrated in FIG. 7, the method 300 includes operations 310 to 340.

In operation 310, a prediction mode parameter of a current block is acquired. The prediction mode parameter indicates that a TIMD is used to determine an intra prediction value of the current block.

In embodiments of the present disclosure, the current block may refer to a block currently being encoded or a coding block, such as a CU, a PU, or the like, which is not limited in the present disclosure. The current block may also be replaced by "coding block", "block", "current coding block", etc., all of which can represent the same or similar meanings.

In some embodiments, when the method 300 is applied to the encoding end, the encoder may determine whether the TIMD mode is used for the current block. Alternatively, the encoder may transmit in the bitstream information indicating whether the TIMD mode is used for the current block, i.e., the prediction mode parameter. Exemplarily, the encoder may calculate the cost of using the TIMD mode, as well as the cost of other modes (for example, selecting a certain MPM mode, selecting a certain non-MPM mode); and if the cost of the TIMD mode is minimal, the encoder may determine that the TIMD mode is used for the current block to determine the intra prediction value of the current block. Otherwise, it is determined that the TIMD mode is not used for the current block to predict the intra prediction value of the current block.

In other embodiments, when the method 300 is applied to the decoding end, the decoder may determine whether the TIMD mode is used for the current block. For example, the decoder may acquire an input bitstream and acquire from the bitstream information indicating whether the TIMD mode is used for the current block, i.e., the prediction mode parameter.

In the embodiments of the present disclosure, the prediction mode parameter indicates that the TIMD mode is used for the current block, that is, the TIMD manner is used for determining the intra prediction value of the current block.

In operation 320, a template of the current block is determined, and the template includes at least two sub-templates.

As an example, the template of the current block (which may also be referred to as the entire template of the current block) is determined, and then the template is partitioned into at least two sub-templates. For example, the entire template of the current block may be determined in the manner described above in combination with FIG. 6; or the template of the current block may be determined in other manners, for example, the left part, the top portion and the left-top portion of the current block are all determined as the entire template of the current block, which is not limited in the present disclosure.

As another example, at least two sub-templates may be directly determined as templates of the current block based on the position of the current block.

In some alternative embodiments, the at least two sub-templates include at least one of a pixel block neighbouring to the left side of the current block, a pixel block neighbouring to the top side of the current block, a left-top pixel block, a left-bottom pixel block, or a right-top pixel block.

Figure 8A:
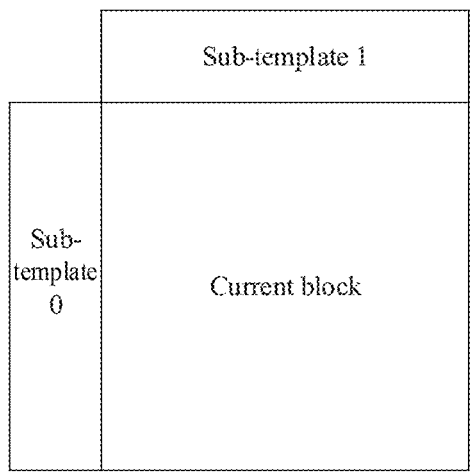
FIG. 8A to FIG. 8D are specific examples of sub-templates according to an embodiment of the present disclosure.

Exemplarily, the at least two sub-templates may belong to different portions of the template of the current block. As an example, the template of the current block may be determined based on the template illustrated in FIG. 6. Referring to FIG. 8A, the template may be partitioned into two portions, which include sub-template 0 and sub-template 1. The sub-template 0 is composed of neighbouring pixels on the left side of the current block, and sub-template 1 is composed of neighbouring pixels on the top side of the current block. In some examples, the sub-template on the left side of the current block may be further partitioned and/or the sub-template on the top side of the current block may be further partitioned. For example, in FIG. 8B, the template may include sub-template 0, sub-template 1, sub-template 2 and sub-template 3.

In addition, in the template illustrated in FIG. 6, only part pixels neighbouring to the left and top sides of the current block are used as templates, but part pixel blocks of the current block (such as the left-top pixel block, the left-bottom pixel block and the right-top pixel block) may also have certain correlation with the current block, especially when the texture of the current block presents some angles. Therefore, the part pixel blocks of the current block (such as the left-top pixel block, the left-bottom pixel block and the right-top pixel block) may also be used as portions of the template.

Figure 8B:
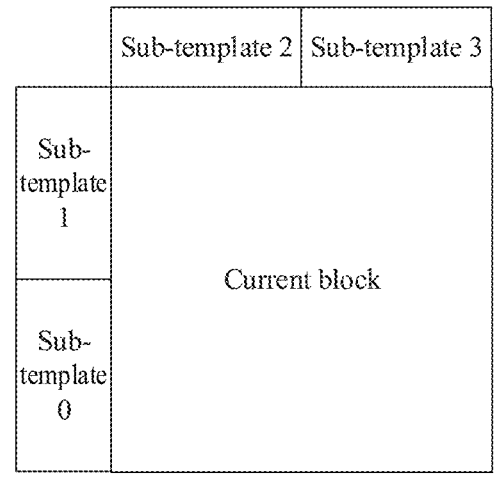
Figure 8C:
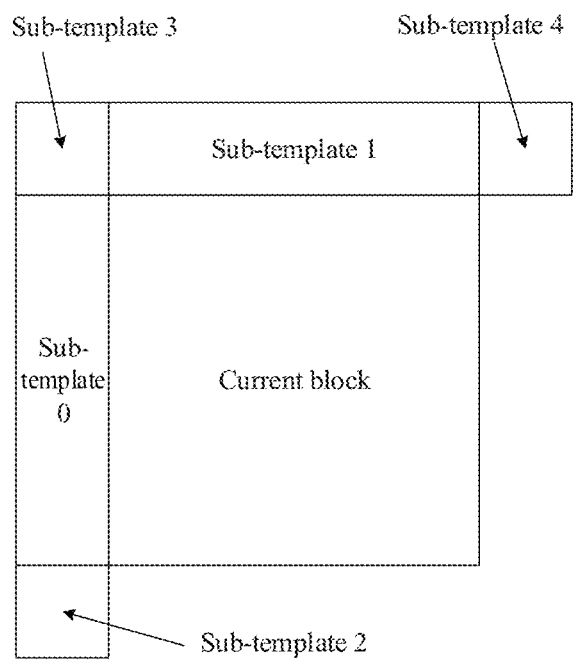
Figure 8D:
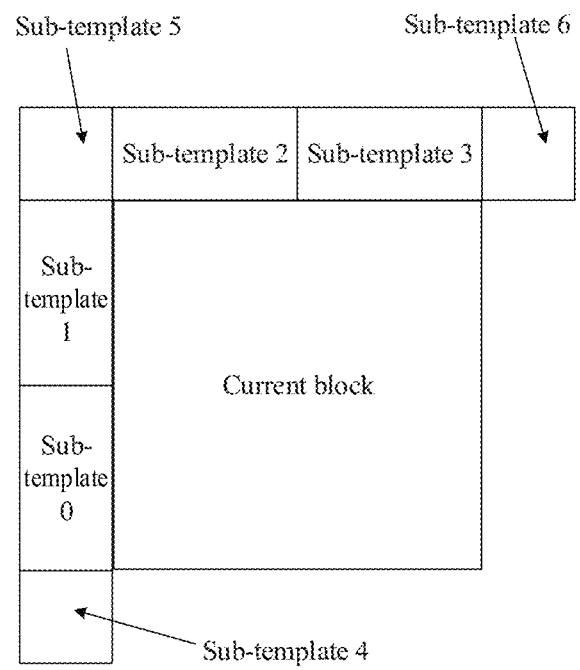

Continuing with reference to FIG. 8A to FIG. 8D, the template in FIG. 8C may further include a sub-template 2, a sub-template 3, and a sub-template 4 relative to the template in (a) of FIG. 8. The sub-template 2 is composed of some pixels on the left-bottom portion of the current block, the sub-template 3 is composed of some pixels on the left-top portion of the current block, and the sub-template 4 is composed of some pixels on the right-top portion of the current block. The template in FIG. 8D may further include a sub-template 4 on the left-bottom portion of the current block, a sub-template 5 on the left-top portion of the current block and a sub-template 6 on the right-top portion of the current block relative to the template in FIG. 8B.

It should be noted that the extension template in FIG. 8C may also be directly used in the existing TIMD method, which is not limited in the present disclosure.

It should be understood that FIG. 8A to FIG. 8D illustrate several specific examples of sub-templates provided in the present disclosure, but this does not constitute a limitation to the present disclosure. For example, the template may also include other encoded or un-encoded pixel portions. These pixel portions may or may not be neighbouring to the current block, which is not limited in the present disclosure.

In some alternative embodiments, the current block may be partitioned into at least two units. Exemplarily, the units may be sub-blocks, or portions, or pixels. The following will be described taking units as sub-blocks.

Figure 16:
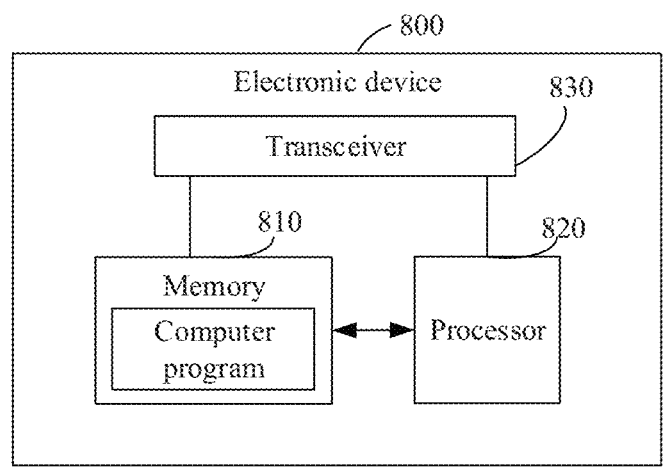
FIG. 16 is a schematic block diagram of an electronic device according to an embodiment of the present disclosure.

Exemplarily, it is assumed that the current block is square. The current block may be partitioned into 4 sub-blocks as illustrated in FIG. 9A or 16 sub-blocks as illustrated in FIG. 9B, which is not limited in the present disclosure. As illustrated in FIG. 9A, the sub-block 0 includes part pixels at the left-top corner of the current block, the sub-block 1 includes part pixels at the right-top corner of the current block, the sub-block 2 includes part pixels at the left-bottom corner of the current block, and the sub-block 3 includes part pixels at the bottom-right corner of the current block. FIG. 9B is similar to FIG. 9A, which will not be repeated here.

It should be understood that FIG. 9A to FIG. 9B illustrate two specific examples of sub-blocks according to an embodiment of the present disclosure, but this does not constitute a limitation to the present disclosure. For example, the current block may also not be square, such as rectangular, circular, trapezoidal or irregular shape, or the current block may also be partitioned into other number of sub-blocks, which is not limited in the present disclosure.

In some embodiments, the current block is partitioned into a fixed number of portions regardless of the size of the current block. In other embodiments, the current block may be partitioned into different numbers of portions depending on the size of the current block. For example, the smaller block (for example, 32×32, 16×6, 4×4, etc.) may be partitioned into 4 portions; and the larger block (for example, 128×128, 64×64, 32×32, etc.) may be partitioned into 16 portions. In other embodiments, the current block may be partitioned into different numbers of portions based on the texture complexity of the current block. For example, the block with simpler texture may be partitioned into 4 portions, and a block with more complex texture may be partitioned into 16 portions.

It should be noted that in the embodiments of the present disclosure, the number of pixels in a unit (such as sub-block, or portion, or pixel) may be one or more, which is not limited in the present disclosure. In some embodiments, when a unit includes one pixel, the operation of partitioning the current block into at least two units may not need to be performed.

In operation 330, respective weights of at least two prediction modes on the first unit are determined based on the respective costs of the at least two prediction modes on the first sub-template. Taking the current block being partitioned into at least one sub-block as an example, the first unit may be, for example, a first sub-block. The at least two sub-blocks include the first sub-block. The at least two sub-templates includes the first sub-template. In the following, the prediction mode may be referred to as mode for short.

In some alternative embodiments, the at least two prediction modes may be at least two modes selected among the candidate modes with the minimum costs on the entire template of the current block.

Exemplarily, several candidate modes may be respectively tried on the entire template of the current block, and at least two modes with the minimum costs are selected. The candidate modes may be modes in the MPM list, or some modes derived according to information of neighbouring blocks, or some modes derived according to other information, or all possible modes, which is not limited in the present disclosure. In some embodiments, the TIMD has expanded 67 intra prediction modes to 131 intra prediction modes, and made the angle of the angular prediction finer.

As an example, the cost may be calculated according to the sum of absolute transformed difference (SATD). As a specific example, it is assumed that mode 0 has the minimum cost on the entire template of the current block, the minimum cost may be denoted as costMode0; mode 1 (denoted as mode 1) has the second minimum (second most minimal) cost on the entire template of the current block, and the second minimum (second most minimal) cost is denoted as costMode1, and so on. Alternatively, at least two prediction modes (for example, two, three, or other numbers) with the minimum costs on the entire template of the current block may be taken as the above at least two prediction modes.

In some alternative embodiments, if the difference of costs corresponding to the at least two prediction modes is not great, the prediction value of the current block may be determined by simultaneously using the at least two prediction modes, for example, the prediction values of the at least two prediction modes may be weighted according to a certain proportion. On the contrary, if the difference of the costs corresponding to at least two prediction modes are too large, the prediction value of the current block may be determined by using the part modes with smaller costs.

As a specific example, when mode 0 and mode 1 are the two modes with the minimum costs on the entire template of the current block, whether the following statement is true is judged:

$$costMode1 < 2*costMode0$$

If it is true, a combination of mode 0 and mode 1 is used. Otherwise, only mode 0 is used.

In other alternative embodiments, the at least two prediction modes may be at least two modes selected among the candidate modes with the minimum costs on the part of sub-templates of the current block.

Specifically, the embodiments of the present disclosure support partitioning the template of the current block into multiple portions (i.e., sub-templates), and the correlation of points close to each other in space is strong, while the correlation of points far from each other is weak. The template partitioned into a top sub-template and a left sub-template (for example, FIG. 8A) is taken as an example. For example, if some pixels are close to the top sub-template and far from the left sub-template, then these points have strong correlation with the top sub-template, that is, the intra prediction mode that has a good effect on the top sub-template is more suitable for these pixels. However, some intra prediction modes have a good effect on the top sub-template, while have a poor effect on the left sub-template, which results in poor effect of these modes on the entire template, so these modes may be discarded in the prior art. However, in embodiments of the present disclosure, these intra prediction modes may be used.

Exemplarily, some candidate modes may be respectively tried on sub-templates of the current block. For example, the modes with minimum costs on each sub-template are selected as at least two prediction modes. The reference is made to the above description for the candidate modes or costs, which will not be repeated in the present disclosure.

As a specific example, referring to FIG. 10, it is assumed that mode 0 has the minimum cost on the entire template (denoted as template 0) of the current block, the minimum cost may be denoted as costMode0; mode 1 has the minimum cost on the sub-template 1 of the current block, the minimum cost may be denoted as costMode1Tem1; and mode 2 has the minimum cost on the sub-template 2 of the current block, the minimum cost may be denoted as costMode2Tem2. Alternatively, three modes (such as the mode 0 with the minimum cost on the entire template of the current block, the mode 1 with the minimum cost on the sub-template 1, and the mode 2 with the minimum cost on the sub-template 2) may be used as the above at least two prediction modes. In this way, among the three selected modes, one mode (mode 0) has best effect on the whole, and the other two modes have best effects locally, for example, the mode 1 has best effect on the sub-template 1 and the mode 2 has best effect on the sub-template 2.

In some alternative embodiments, a mode which has good effect (i.e., with a small cost) on a local template may not necessarily has good effect on the entire template, so limitations may be further set when selecting at least two prediction modes. For example, the costs of the at least two prediction modes on the entire template may not exceed a first value. The first value is a preset threshold value, or the first value is an integer multiple (for example, twice or other integer multiple) of a cost (for example, costMode0) of the mode (i.e., mode 0) (which has the minimum cost on the template) on the entire template, which is not limited in the present disclosure.

As a specific example, when mode0, mode1 and mode2 are the modes with the minimum costs on the entire template, the sub-template 1 and the sub-template 2 of the current block, respectively, the cost of mode1 or mode2 on the entire template may be further set to not exceed twice of costMode0.

After determining the at least two modes, the weights of the at least two prediction modes on the first sub-block may be determined based on the respective costs of the at least two prediction modes on the first sub-template. Exemplarily, the first sub-template may be one of the at least one sub-template determined in the operation 320, and the first sub-block may be one of the at least one sub-block determined above. That is, the weights of the at least two prediction modes at different positions of the current block may be calculated based on the costs of the at least two prediction modes on different sub-templates on the template.

In some alternative embodiments, the first sub-template includes a sub-template closest to the first sub-block among at least two sub-templates. For example, the first sub-template may be neighbouring to the first sub-block. That is, in the embodiments of the present disclosure, based on the prediction effect of at least two prediction modes on different sub-templates on the template, the prediction effect of at least two prediction modes on corresponding neighbouring portions of the current block may be estimated.

Figures 11A, 11B, 11C:
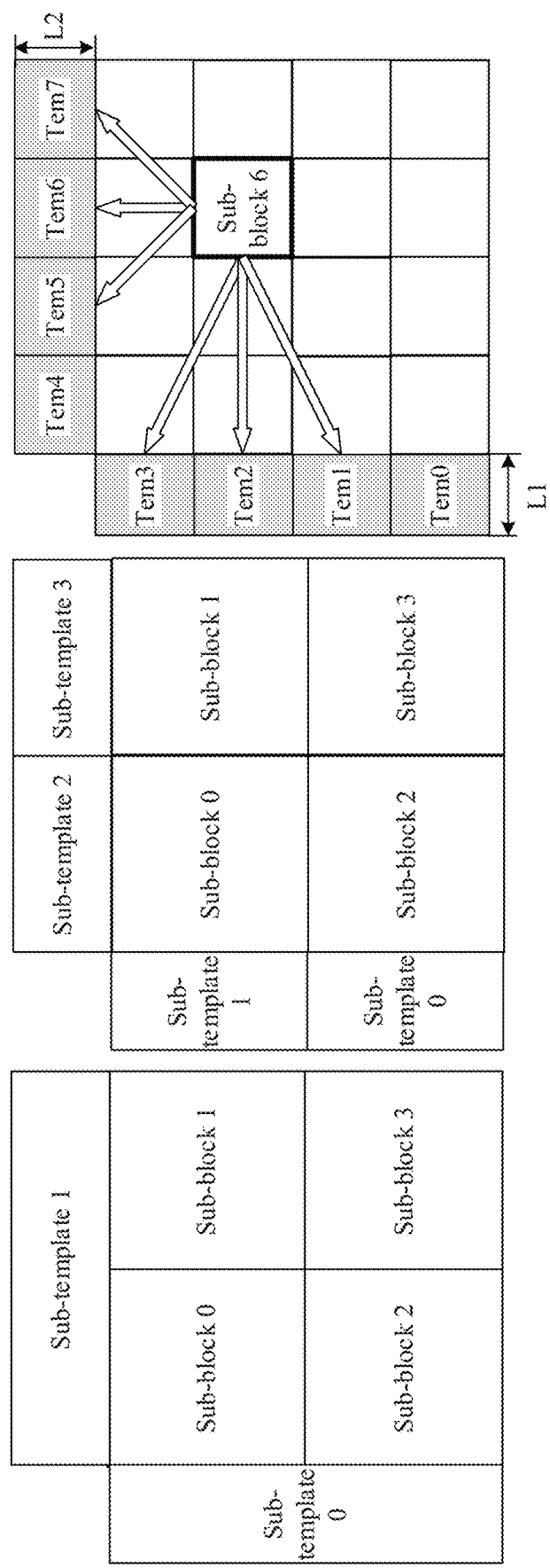
FIG. 11A to FIG. 11C are specific examples of sub-templates and sub-blocks according to an embodiment of the present disclosure.

With reference to FIG. 11A to FIG. 11C, taking of selecting two modes with the minimum costs on the entire template of the current block as an example, a process of respectively determining weights of at least two prediction modes on the first sub-block based on the respective costs of the at least two prediction modes on the first sub-template is described below. It will be understood that the embodiments of the present disclosure may be extended to the situation of more combinations of modes. When more than two modes are selected, the weight of each mode on the sub-block may be determined based on the same or similar manner as the two modes, which will not be repeated in the present disclosure.

As a specific example, referring to FIG. 11A, the sub-templates are for example two sub-templates in FIG. 8A and the sub-blocks are for example sub-blocks in FIG. 9A. Taking the FIG. 11A as an example, the distance between sub-block 0 and sub-template 0 and the distance between sub-block 0 and sub-template 1 may be considered the same, and the distance between sub-block 3 and sub-template 0 and the distance between sub-block 3 and sub-template 1 may be considered the same. However, the distance between sub-block 1 and sub-template 1 is closer than the distance between sub-block 1 and sub-template 0, and the distance between sub-block 2 and sub-template 0 is closer than the distance between sub-block 2 and sub-template 1. Thus, the sub-block 1 may give greater weight to the mode that has better effect on the sub-template 1, and the sub-block 2 may give greater weight to the mode that has better effect on the sub-template 0. Here, a good effect of a mode on a sub-template may be understood as that the mode has a low cost on the sub-template, and the poor effect of a mode on a sub-template may be understood that the mode has a great cost on the sub-template.

As an example, the above mode with the minimum cost on the entire template of the current block is denoted as mode 0, and the cost of this mode on the entire template is costMode0, the cost of this mode on sub-template 0 is costMode0Tem0, and the cost of this mode on sub-template 1 is costMode0tem1. The above mode with the second minimum cost on the entire template of the current block is denoted as mode1, and the cost of this mode on the entire template is costMode1, the cost of this mode on the sub-template 0 is costMode1Tem0, and the cost of this mode on the sub-template 1 is costMode1Tem1.

Exemplarily, for the sub-block 1 (one example of the above first sub-block), in the case of using a combination of two modes (i.e., mode 0 and mode 1), the weights of the respective modes are calculated as illustrated by the following formula (1) and formula (2):

$$weight0Part1 = \frac{costMode1Tem1}{costMode0Tem1 + costMode1Tem1} \quad (1)$$

$$weight1Part1 = 1 - weight0Part1 \quad (2)$$

Herein, weight0Part1 is the weight of mode 0 on sub-block 1, and weight1Part1 is the weight of mode 1 on sub-block 1.

Similarly, for the sub-block 2 (another example of the above first sub-block), in the case of using a combination of two modes (i.e., for example, mode 0 and mode 1), the weights of the respective modes are calculated as illustrated by the following formula (3) and formula (4)

$$weight0Part2 = \frac{costMode1Tem0}{costMode0Tem0 + costMode1Tem0} \quad (3)$$

$$weight1Part2 = 1 - weight0Part2 \quad (4)$$

Herein, weight0Part2 is the weight of mode 0 on sub-block 2, and weight 1 Part2 is the weight of mode 1 on sub-block 2.

As can be seen, since the sub-block 1 is closer to the sub-template 1, the weights of the two modes (mode 0 and mode 1) on sub-block 1 are determined based on the effect of these two modes on the sub-template 1. Since the sub-block 2 is closer to the sub-template 0, the weights of the two modes (mode 0 and mode 1) on sub-block 2 are determined based on the effect of these two modes on the sub-template 1.

In some alternative embodiments, the weights of the at least two prediction modes on the second sub-block may further be determined based on the respective costs of the at least two prediction modes on the template (i.e., the entire template of the current block). The second sub-block is a specific example of a second unit. The at least two sub-blocks include the second sub-block. As an example, the second sub-block has the same (or approximately the same) distance from at least two sub-templates.

For example, for sub-block 0 and sub-block 3 (a specific example of the above second sub-block) in FIG. 11A, since the distance between sub-block 0 and sub-template 0 and the distance between sub-block 0 and sub-template 1 may be considered the same, and the distance between sub-block 3 and sub-template 0 and the distance between sub-block 3 and sub-template 1 may be considered the same, the weights of the at least two prediction modes on the sub-block 0 and the sub-block 3 may be respectively determined based on the costs of mode 0 and mode 1 on the entire template (i.e., the sum of sub-template 0 and sub-template 1), respectively. Here, mode 0 and mode 1 have the same weight on sub-block 0 and sub-block 3.

In some alternative embodiments, the weights of the at least two prediction modes on the first sub-block may be respectively determined based on the respective costs of the at least two prediction modes on the first sub-template and the respective costs of the at least two prediction modes on the second sub-template. The at least two sub-templates include the second sub-template.

Exemplarily, the distance between the first sub-template and the first sub-block may be less than the distance between the second sub-template and the first sub-block. At this time, the influence of the costs of the at least two prediction modes on the first sub-template on the weights is greater than the influence of the costs of the at least two prediction modes on the second sub-template on the weights. That is to say, the less the distance between the sub-template and the sub-block, the greater the influence of the cost of the prediction mode on the sub-template on the weight of the prediction mode on the sub-block.

Continuing the above example in FIG. 11A, the weights of the two modes (mode 0 and mode 1) on sub-block 1 may also consider the effect of the two modes on sub-template 0, but the influence of the two modes on sub-template 1 is greater. The weights of two modes (mode 0 and mode 1) on sub-block 2 may also consider the effect of the two modes on sub-template 1, but the influence of the two modes on sub-template 0 is greater.

Exemplarily, for sub-block 1 (one example of the above first sub-block), in the case of using a combination of two modes (i.e., for example, mode 0 and mode 1), the weights of the respective modes are calculated as illustrated in the following formulas (5) and (6):

$$weight0Part1 = \frac{3*costMode1Tem1 + costMode1Tem0}{3*(costMode0Tem1 + costMode1Tem1) + costMode0Tem0 + costMode1Tem0} \quad (5)$$

$$weight1Part1 = 1 - weight0Part1 \quad (6)$$

Herein, weight0Part1 is the weight of mode 0 on sub-block 1, and weight1Part1 is the weight of mode 1 on sub-block 1.

Similarly, for sub-block 2 (another example of the above first sub-block), in the case of using a combination of two modes (i.e., for example, mode 0 and mode 1), the weights of the respective modes are calculated as illustrated in the following formulas (7) and (8):

$$weight0Part2 = \frac{3*costMode1Tem0 + costMode1Tem1}{3*(costMode0Tem0 + costMode1Tem0) + costMode0Tem1 + costMode1Tem1} \quad (7)$$

$$weight1Part2 = 1 - weight0Part2 \quad (8)$$

Herein, weight0Part2 is the weight of mode 0 on sub-block 2, and weight1 Part2 is the weight of mode 1 on sub-block 2.

That is, in the above examples, the costs of the two sub-templates are weighted by using a weight of 1:3 or 3:1.

In some alternative embodiments, the weights of the at least two prediction modes on the first sub-block may be respectively determined based on the respective costs of the at least two prediction modes on the first sub-template and the respective costs of the at least two prediction modes on the template (i.e., the entire template of the current block).

Continuing with the above example of FIG. 11A, the weights of the two modes (mode 0 and mode 1) on sub-block 1 may consider the effect of the two modes on the entire template of the current block. Alternatively, the influence of the two modes on the sub-template may be greater than the influence of the two modes on the entire template, or less than the influence of the two modes on the entire template, which is not limited in the present disclosure.

As an example, for sub-block 1, in the case of using a combination of two modes (i.e., for example mode 0 and mode 1), the weights of the respective modes are calculated as illustrated in the following formulas (9) and (10):

$$weight0Part1 = \frac{3*costMode1Tem1 + costMode1}{3*(costMode0Tem1 + costMode1Tem1) + costMode0 + costMode1} \quad (9)$$

$$weight1Part1 = 1 - weight0Part1 \quad (10)$$

Similarly, the weights of mode 0 and mode 1 on sub-block 2 can refer to the calculation process of mode 0 and mode 1 on sub-block 1, and the weights of mode 0 and mode 1 on sub-block 0 and sub-block 3 can refer to the calculation process of the weights of mode 0 and mode 1 on sub-block 0 and sub-block 3 in FIG. 11A, which will not be repeated in the present disclosure.

That is, in the above example, the costs of sub-template 1 and the entire template are weighted by using a weight of 1:3 or 3:1.

In some alternative embodiments, the template of the current block may be partitioned into more sub-templates, such as 4 sub-templates, or 16 sub-templates, so that the effect of a mode on a finer-grained template may be obtained, thereby enabling the calculation of weights to refer to more information, and contributing to a finer determination of the weight of each mode on each sub-block.

In some alternative embodiments, the current block may be partitioned into more sub-blocks, such as 16 sub-blocks, 32 sub-blocks, etc., so that the current block may be partitioned into finer-grained sub-blocks, and thereby enabling the calculation of weights to be performed on the finer-grained sub-blocks, and contributing to finer determination of the weights of each mode on each sub-block.

As a specific example, referring to FIG. 11B, the sub-templates are for example the four sub-templates in FIG. 8B and the sub-blocks are for example the sub-blocks in FIG. 9A. Similar to FIG. 11A, the distances from sub-block 0 or sub-block 3 to the respective sub-templates may be considered the same, and the weights of the at least two prediction modes on sub-block 0 and sub-block 3 may be respectively determined based on the respective costs of the at least two prediction modes on the template (i.e., the entire template of the current block). For sub-block 1 and sub-block 2, the weights of at least two prediction modes on sub-block 1 and sub-block 2 can be respectively determined based on the costs of the at least two prediction modes on sub-template 0 to sub-template 3, respectively.

As an example, the above mode with the minimum cost on the entire template of the current block is mode 0, the cost of this mode on the entire template is costMode0 and the cost of this mode on template X is costMode0TemX, where X is 0, 1, 2 or 3. The above mode with the second minimum cost on the entire template of the current block is mode 1, the cost of this mode on the entire template is costMode1, and the cost of this mode on template X is costMode1TemX.

As an example, for sub-block 1, in the case of using a combination of two modes (i.e., mode 0 and mode 1), the weights of the respective modes are calculated as illustrated by the following formulas (11) and (12):

$$weight0Part1 = \frac{A}{B} \quad (11)$$

where, $A = 4*costMode1Tem3 +$ $3*costMode1Tem2 + 2*costMode1Tem1 + costMode1Tem0$ $B = 4*(costMode0Tem3 + costMode1Tem3) +$ $3*(costMode0Tem2 + costMode1Tem2) +$ $2*(costMode0Tem1 + costMode1Tem1) +$ $(costMode0Tem0 + costMode1Tem0)$ $$weight1Part1 = 1 - weight0Part1 \quad (12)$$

Similarly, the weights of mode 0 and mode 1 on sub-block 2 can refer to the calculation process of mode 0 and mode 1 on sub-block 1, and the weights of mode 0 and mode 1 on sub-block 0 and sub-block 3 can refer to the calculation process of the weights of mode 0 and mode 1 on sub-block 0 and sub-block 3 in FIG. 11A, which will not be repeated in the present disclosure.

It should be noted that in the embodiments of the present disclosure, the maximum value of the calculated weight cannot exceed 1. If the calculated weight is greater than 1, the weight value should be clipped to 1.

As another specific example, referring to FIG. 11C, the sub-template and the current block are partitioned more finely. For example, the current block is partitioned into several sub-blocks according to the size of 4×4, and the left template is correspondingly partitioned into sub-templates according to the size of L1*4, and the top template is also partitioned into sub-templates according to the size of 4*L2.

For example, in FIG. 11C, the current block is a 16×16 block, the current block may be partitioned into 16 sub-blocks according to the size of 4×4, and the templates are correspondingly partitioned into 8 sub-templates, such as Tem0 to Tem8 in the figure.

As an example, when calculating the weights of the prediction modes for the sub-blocks in FIG. 11C, the closest one or more sub-templates in the horizontal and vertical directions corresponding to the current sub-block may be used. For example, for sub-block 6 in FIG. 11C, three sub-templates closest in the horizontal direction (such as Tem1, Tem2, and Tem3) may be used, and three sub-templates closest in the vertical direction (such as Tem5, Tem6, and Tem7) may be used. Specifically, the manner in which the weights of at least two patterns on each sub-block are calculated may be referred to the above description, which will not be repeated in the present disclosure.

In some alternative embodiments, when the cost of a prediction mode on a first sub-template of the current block is minimal, the prediction mode may be set to have a greater weight at a sub-block or point closer to the first sub-template, and have a less weight at position farther from the first sub-template, even to zero. For example, referring to FIG. 10, for the case that mode 0 has best effect on the entire template, mode 1 has best effect on sub-template 1, and mode 2 has best effect on sub-template 2, the weights of mode 2 from top to bottom on the current block may be set according to the descending order, and the weights of mode 1 from left to right on the current block may be set according to the descending order. For example, in the case of partitioning the current block into four sub-blocks, the weights of mode2 on the top two sub-blocks (for example, sub-block 0 and sub-block 1) are not 0, the weights of mode2 on the bottom two sub-blocks (for example, sub-block 2 and sub-block 3) are 0, the weights of mode1 on the left two sub-blocks (sub-block 0 and sub-block 2) are not 0, and the weights of mode1 on the right two sub-blocks (for example, sub-block 1 and sub-block 3) are 0.

It should be noted that if the cost of a mode on the sub-template is too great, the weight of the mode on the sub-template may be set to 0. Exemplarily, it may be determined that the cost of mode 1 on sub-template 1 is too great when the cost of mode 1 on sub-template 1 is greater than twice of the cost of mode 0 on sub-template 1.

In operation 340, the intra prediction value of the current block is determined based on the respective weights of the at least two prediction modes on the first unit.

Exemplarily, taking the first unit being the first sub-block as an example, when the first pixel is located in a sub-block N (an example of the first sub-block) of the current block, the intra prediction value of the first pixel may be the sum of the product of the intra prediction value of each mode at the first position and the weight of the each mode on the sub-block N. N is an integer greater than or equal to 0. For example, in the case of partitioning the current block into four sub-blocks, N=0, 1, 2 or 3.

As a specific example, the above first pixel may be represented as (x, y), and for the case where at least two prediction modes are mode0 and mode1, it may be assumed that the prediction value of mode 0 at the (x, y) position is pred0XY, and the prediction value of mode 1 at the (x, y) position is pred1XY. Then the prediction value predXY at (x, y) may be represented as the following formula (13):

$$predXY = pred0XY * \text{weight0}PartN + pred1XY * \text{weight1}PartN \quad (13)$$

When the respective weights of the at least two prediction modes on the second unit are determined based on the respective costs of the at least two prediction modes on the template, the operation 340 may specifically include that the intra prediction value of the current block is determined based on the respective weights of the at least two prediction modes on the first unit and the respective weights of the at least two prediction modes on the second unit.

Specifically, taking the unit including sub-blocks as an example, the manner in which the intra prediction value at a position in sub-block N is determined may be referred to the above description. For the second pixel on the sub-block M (an example of the second sub-block), the prediction value of the second pixel may be the sum of the product of the prediction value of each mode at the second pixel and the weight of the each mode on the sub-block M. Herein, M is an integer greater than or equal to 0, and N is not equal to M. Similarly, the description of above formula 13 may be referred. Different from the process of determining the prediction value of the first pixel, the manner in which the respective weights of the prediction modes at the second pixel are determined is different from the manner in which the respective weights of the prediction modes at the first pixel are determined.

In some embodiments, for example, in actual implementation, in order to avoid the use of decimals, a method of first amplifying and then normalizing may be used. For example, the weights may be scaled up by 8 times. In order to achieve a rounding-like effect, an offset value may be added, and the final prediction value may be shifted to the right by 3 bits.

Therefore, in the embodiments of the present disclosure, at least two sub-templates of the current block are determined, the respective weights of the at least two prediction modes on the first unit of the current block are determined based on the respective costs of the at least two prediction modes on the sub-template, and further the prediction value of the current block is determined based on the weights. Since in the embodiments of the present disclosure, the respective weights of at least two prediction modes on different units of the current block are determined, different weights can be set for different points of the current block, thereby contributing to more accurate determination of intra prediction value of the current block and further improving compression efficiency.

It should be noted that the first unit and the second unit in the embodiments of the present disclosure may be different pixels in the current block, pixels in different sub-blocks in the current block, or pixels in different portions of the current block, which are not limited in the present disclosure. That is to say, in the embodiments of the present disclosure, the weights may be calculated in unit of point (i.e., pixel), the weights may be calculated in unit of sub-block or the weights may be calculated in unit of portion, which is not limited in the present disclosure. In other words, in embodiments of the present disclosure, the granularity of calculating weights may be in unit of point, in unit of sub-block or in unit of portion, which is not limited in the present disclosure.

Exemplarily, by calculating the respective weights of the prediction modes on each unit (for example, sub-blocks, portions, or pixels) of the current block, it is possible to give more weight to a mode that has good effect on the unit and give less weight to a mode that has poor effect on the unit as much as possible. That is, a great weight is given to a mode that has a good prediction effect on a place (for example, sub-block, portion, or pixel) and a less weight is given to a mode that has a poor prediction effect on a place, which is more reasonable than the method of unifying the weights on the whole current block, so that a prediction block with more complex texture can be produced.

The solutions of the embodiments of the present disclosure can be applied to scenarios with complex textures, such as a scenario with some distorted lines or with uneven surfaces, etc. That is to say, in these scenarios with more complex textures, the embodiments of the present disclosure do not need to encode more residuals or partition smaller blocks to make the textures in a single block simple, but directly perform intra prediction, so that the embodiments of the present disclosure can help to make complex prediction under the condition of using as few flag bits as possible, thus contributing to improving compression efficiency.

In some alternative embodiments, after performing the intra prediction according to the above method 300, the weights of the above at least two prediction modes at the junction position between units (for example, sub-blocks, portions, pixels, etc.) in the current block are different, which may result in a boundary of the prediction block of the current block at the junction position between some units. As one possible processing method, a smoothing filtering process such as an operation similar to deblocking filtering may be performed after the prediction values of the respective modes are weighted according to the weights. As another possible processing method, certain algorithms may be used to ensure that the change of weights of neighbouring portions will not be too great. As another possible processing method, the current block may be partitioned into finer granularity in the process of calculating the respective weights of modes in each portion, for example, a weight is calculated for each 4×4 sub-block, or a weight is calculated for each pixel, so as to ensure that the change of weights of neighbouring units are not too great.

Alternatively, when the current block is partitioned into finer granularity, more sub-templates may be partitioned to better match the granularity of calculation of weights. For example, referring to the example illustrated in FIG. 11B, the current block may be partitioned into two blocks in the horizontal direction and two blocks in the vertical direction, i.e., four sub-blocks in total. Correspondingly, the left template may also be partitioned into two blocks, such as sub-template 0 and sub-template 1 as illustrated in the figure, and the top template may also be partitioned into two blocks, such as sub-template 2 and sub-template 3 as illustrated in the figure, so that the effect of a certain mode on a finer-grained template can be obtained, and more information may be referred for calculation of weights.

In addition, the embodiments of the present disclosure further provide a method for intra prediction. After determining the weights of at least two prediction modes on at least two units (for example, sub-blocks, portions, or pixels, etc.) in the current block, the change rates of the weights in the first direction (for example, vertical direction or horizontal direction) may be further determined based on the weights on the at least two units. Based on the change rates, the weights on other units of the current block may be further determined in a smooth transition manner to determine the intra prediction value of the current block. Since in the embodiments of the present disclosure, the respective weights of at least two prediction modes on different units of the current block can be determined, so that different weights can be set at different positions in the current block, and the embodiments of the present disclosure are helpful to more accurately determine the intra prediction value of the current block, thereby improving the compression efficiency.

Figure 12:
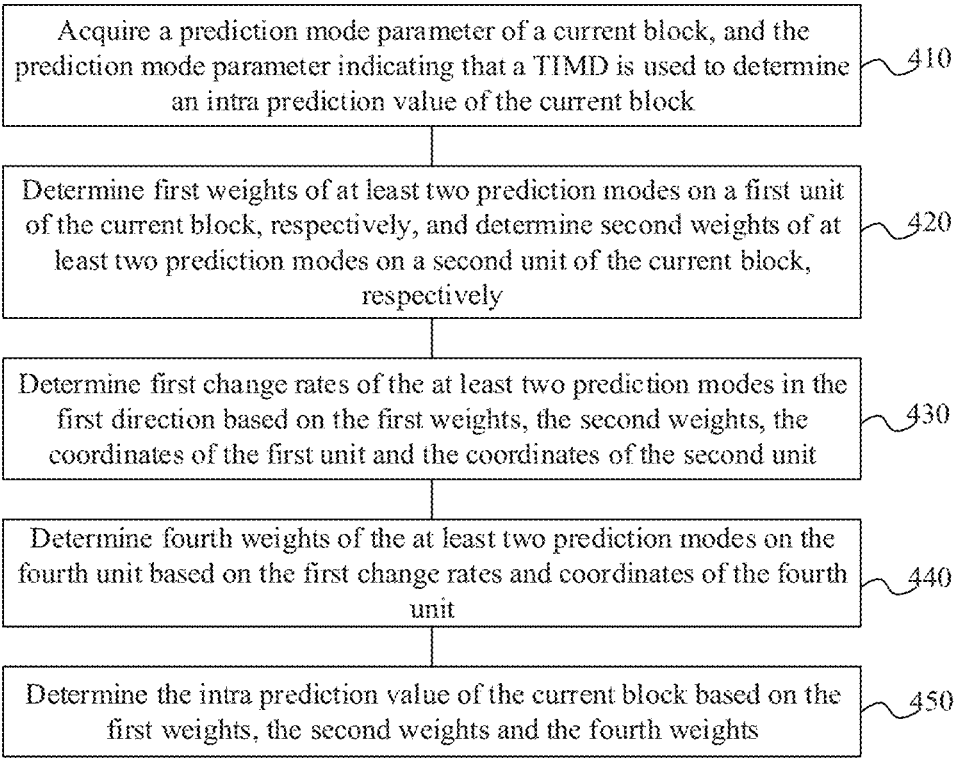
FIG. 12 is a schematic flowchart of another method for intra prediction according to an embodiment of the present disclosure.

FIG. 12 illustrates a schematic flowchart of another method 400 for intra prediction according to an embodiment of the present disclosure. The method 400 may be applied to an encoder such as encoder 100 in FIG. 1 or to a decoder such as decoder 200 in FIG. 2. Further, the method 400 may be applied to the intra prediction unit 106 in the encoder 100 or the intra prediction unit 204 in the decoder 200. As illustrated in FIG. 12, the method 400 includes operations 410 to 450.

In operation 410, a prediction mode parameter of a current block is acquired. The prediction mode parameter indicates that a TIMD is used to determine an intra prediction value of the current block.

Specifically, the operation 410 can refer to the description for the operation 310 of method 300, which will not be repeated in the present disclosure.

In operation 420, first weights of at least two prediction modes on a first unit of the current block are determined respectively, and second weights of at least two prediction modes on a second unit of the current block are determined respectively. Coordinates of the first unit and coordinates of the second unit are different in a first direction.

In some alternative embodiments, the above at least two prediction modes are determined based on the costs of the candidate modes on the template (i.e., the entire template) of the current block, and/or based on the costs of the candidate modes on some sub-templates in the template.

Alternatively, in case that the at least two prediction modes are determined based on the costs of candidate modes on the part of the at least two sub-templates, costs of the at least two prediction modes on the template does not exceed a first value. The first value is a preset threshold value, or the first value is twice of a cost of a first prediction mode. The first prediction mode is a mode with a minimum cost on the template.

Exemplarily, the at least two prediction modes may include two prediction modes, or three prediction modes, or more, which is not limited in the present disclosure. Specifically, the manner of determining the prediction mode can refer to the description of the operation 340 in FIG. 7, which will not be repeated in the present disclosure.

Exemplarily, the first unit and the second unit may be different pixels in the current block, or pixels in different sub-blocks in the current block, or pixels in different portions in the current block, which are not limited in the present disclosure. Alternatively, when the first unit and the second unit are pixels in different portions or in different sub-blocks, the method 400 further includes partitioning the current block into at least two sub-blocks or at least two portions. That is to say, in the embodiments of the present disclosure, the weights may be calculated in unit of point (i.e., pixel), the weights may be calculated in unit of sub-block or the weights may be calculated in unit of portion, which is not limited in the present disclosure. In other words, in the embodiments of the present disclosure, the granularity of the change of weights may be in unit of point, in unit of sub-block or in unit of portion, which is not limited in the present disclosure.

In some embodiments, the first weights of the at least two prediction modes on the first unit of the current block and the second weights of the at least two prediction modes on the second unit of the current block may be determined according to the method 300. The specific process can refer to the description of method 300, which will not be repeated in the present disclosure. In other embodiments, the weights on the first unit of the current block and the weights on the second unit of the current block may also be determined according to other methods, which are not limited in the present disclosure.

In some alternative embodiments, the method 400 may further include determining third weights of the at least two prediction modes on a third unit of the current block, respectively. The coordinates of the first unit and the coordinates of the third unit are different in a second direction. The second direction is perpendicular to the first direction.

Exemplarily, the third unit may be a pixel in the current block that is different from the first unit and the second unit, or a pixel in a sub-block that is different from the first unit and the second unit, or a pixel in a portion that is different from the first unit and the second unit, which is not limited in the present disclosure.

Exemplarily, the first direction may be a vertical direction and the second direction is a horizontal direction, which are not limited in the present disclosure.

Specifically, the third weights of the at least two prediction modes on the third unit of the current block may be determined according to method 300 or other methods, which are not limited in the present disclosure.

Figure 13A:
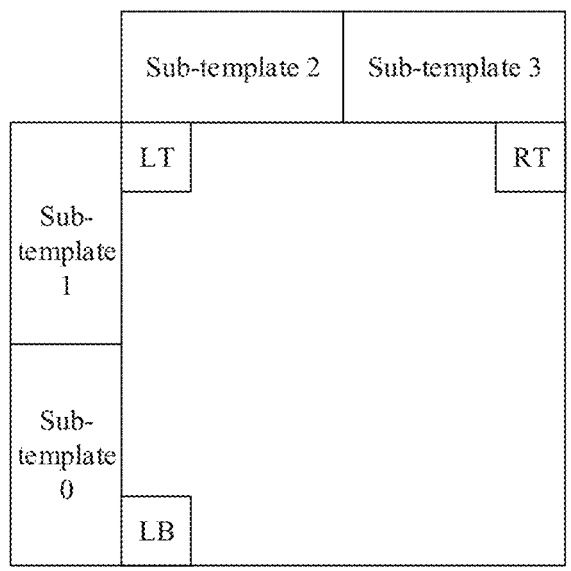
FIG. 13A to FIG. 13B are specific examples of three units in the current block according to an embodiment of the present disclosure.

In some alternative embodiments, the first unit may be located at a left-top corner position of the current block, the second unit may be located at a left-bottom corner position of the current block, and the third unit may be located at a right-top corner position of the current block. Referring to FIG. 13A, as an example, the size of the current block is M×N, then the first unit may be located at the left-top corner position (denoted as LT), the coordinates of the first unit may be denoted as (0, 0), the second unit may be located at the left-bottom corner position (denoted as LB), the coordinates of the second unit may be denoted as (0, N−1), the third unit may be located at the right-top corner position (denoted as RT), and the coordinates of the third unit may be denoted as (M−1, 0).

Figure 13B:
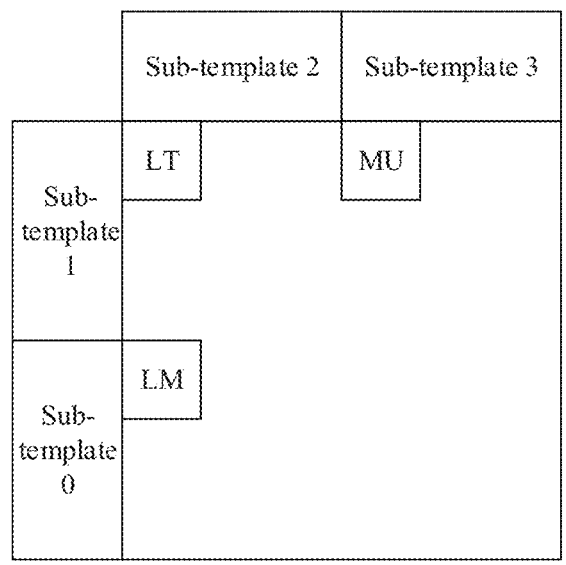

In other alternative embodiments, the above first unit may be located at the left-top corner position of the current block, the second unit may be located at a right-middle position of the current block, and the third unit may be located at a middle-top position of the current block. Referring to FIG. 13B, as an example, the size of the current block is M×N, then the first unit may be located at the left-top corner position (denoted as LT), the coordinates of the first unit may be denoted as (0, 0), the second unit may be located at the left-middle position (denoted as LM), the coordinates of the second unit may be denoted as (0, N/2), the third unit may be located at the middle-upper position (denoted as MU), and the coordinates of the third unit may be denoted as (M/2, 0).

It should be noted that in the embodiments of the present disclosure, all the coordinates are coordinates relative to the left-top corner of the current block. In other words, in the embodiments of the present disclosure, the coordinates of left-top corner position are marked as (0, 0) in a local range (i.e., inside the current block).

As a specific example, selecting two modes (such as mode0 and mode1) with the minimum costs on the entire template of the current block is taken as an example. Referring to FIG. 13A, the weight of mode0 at the left-bottom corner position may be represented as weight0LB, the weight of the mode0 at the left-top corner position may be represented as weight0LT, and the weight of the mode0 at the right-top corner position may be represented as weight0RT. Exemplarily, taking the template of the current block being partitioned into sub-template 0, sub-template 1, sub-template 2 and sub-template 3 as an example, the weights of mode 0 at the above three positions may be illustrated by the following formulas (14)-(16), respectively:

$$\text{weight0}LT = \frac{(costMode1Tem1 + costMode1Tem2)}{costMode0Tem1 + costMode1Tem2} \quad (14)$$
$$costMode0Tem2 + costMode1Tem2$$

$$\text{weight0}LB = \frac{costMode1Tem0}{costMode0Tem0 + costMode1Tem0} \quad (15)$$

$$\text{weight0}RT = \frac{costMode1Tem3}{costMode0Tem3 + costMode1Tem3} \quad (16)$$

Exemplarily, the weights of mode1 at the above three positions are 1 minus the weights of mode0, respectively.

As another specific example, selecting the mode with the minimum cost on the entire template of the current block and the modes with the minimum costs on the sub-templates is taken as an example. Referring to FIG. 10, for example, the mode with the minimum cost on the entire template is mode0, the mode with the minimum cost on the sub-template 1 is mode1, and the mode with the minimum cost on the sub-template 2 is mode2. The weight on each position may be calculated based on the costs of these modes in the respective templates. It is assumed that the cost of modeX on sub-template Y is costModeXtemY; herein, X has a value range of 0, 1 or 2, and Y has a value range of 0, 1 or 2. Referring to FIG. 13A and FIG. 13B, the left-top corner position LT is denoted as pos0, the left-bottom corner position LB or the left-middle position LM is denoted as pos1, and the right-top corner position RT or the middle-upper position MU is denoted as pos2. Then, the weight of ModeX on posZ (Z is 0, 1 or 2) may be denoted as weightXposZ.

Then, the weights of the three modes on posZ are illustrated in the following formula:

$$\text{weight1}PosZ = \quad (17)$$
$$\frac{costMode0TemZ + costMode2TemZ}{2*(costMode0TemZ + costMode1TemZ + costMode2TemZ)}$$

$$\text{weight2}PosZ = \quad (18)$$
$$\frac{costMode0TemZ + costMode1TemZ}{2*(costMode0TemZ + costMode1TemZ + costMode2TemZ)}$$

$$\text{weight0}PosZ = 1 - \text{weight1}PosZ - \text{weight2}PosZ \quad (19)$$

Where, TemZ represents the template (or sub-template) corresponding to posZ. For example, for pos0, TemZ is the entire template, such as template 0; for pos1, TemZ is the sub-template 1 closest (for example, neighbouring) to pos1; and for pos2, TemZ is the sub-template 2 closest (for example, neighbouring) to pos2.

In operation 430, first change rates of the at least two prediction modes in the first direction are determined based on the first weights, the second weights, the coordinates of the first unit and the coordinates of the second unit.

That is, the change rates of the prediction modes in the first direction may be determined based on the weights on the first unit and the second unit, and coordinates of the first unit and the second unit. Exemplarily, when the first unit and the second unit are pixels, the first direction may be a direction of the straight line where the first unit and the second unit are located. When the first unit and the second unit are sub-blocks or portions, the first direction may be the direction of the straight line where the center of the first unit and the center of the second unit are located. As a specific example, in FIG. 13A and FIG. 13B, the first direction is a vertical direction.

In some alternative embodiments, second change rates of the at least two prediction modes in the second direction may further be determined based on the first weights, the third weights, and the coordinates of the first unit and the coordinates of the third unit.

Exemplarily, when the first unit and the third unit are pixels, the second direction may be the direction of the straight line where the first unit and the third unit are located. When the first unit and the third unit are sub-blocks or portions, the second direction may be the direction of the straight line where the center of the first unit and the center of the third unit are located. As a specific example, in FIG. 13A and FIG. 13B, the second direction is a horizontal direction.

Alternatively, a linear model (for example, a linear function) or a non-linear model (for example, a quadratic function, or a cubic function, etc.) may be used to derive the change rates of the weights in the first direction or the second direction. That is, when it is considered that the weights are changed uniformly from point to point (or sub-blocks or portions), a linear model may be used to calculate the change rates of the weights in the first direction or the second direction. On the other hand, using linear model can make the computational complexity lower.

As a specific example, referring to FIG. 13A, when a linear model is used to calculate the first change rates of weights in the vertical direction, the first change rate of mode0 in the vertical direction may be represented as the following formula (20):

$$\frac{\text{weight0}LB - \text{weight0}LT}{N-1} \quad (20)$$

When a linear model is used to calculate the second change rates of weights in the horizontal direction, the second change rate of mode0 in the horizontal direction may be represented as the following formula (21):

$$\frac{\text{weight0}RT - \text{weight0}LT}{M-1} \quad (21)$$

As another specific example, referring to FIG. 13B, when a linear model is used to calculate the first change rate of the weights in the vertical direction, the first change rate of the mode0 in the vertical direction may be represented as the following formula (22):

$$\frac{2(\text{weight0}LM - \text{weight0}LT)}{N} \quad (22)$$

When a linear model is used to calculate the second change rates of weights in the horizontal direction, the second change rate of mode0 in the horizontal direction may be represented as the following formula (23):

$$\frac{2(\text{weight0}MU - \text{weight0}LT)}{M} \quad (23)$$

In operation 440, fourth weights of the at least two prediction modes on the fourth unit are determined based on the first change rates and coordinates of the fourth unit.

Exemplarily, when the fourth unit is a pixel, the coordinates of the fourth unit may be denoted as (x, y). As a specific example, the fourth unit may be a pixel on the same straight line as the first unit and the second unit, in which case the weights of at least two prediction modes on the fourth cell may be determined based on the first change rates and the coordinates of the fourth unit.

In some alternative embodiments, the fourth weights may be determined based on the first change rates, the second change rates, and the coordinates of the fourth unit. Here, the fourth unit may be any unit of the current block.

As a specific example, continuing to refer to FIG. 13A, when the first change rate is represented as formula (20), the second change rate is represented as formula (21), and the fourth unit is represented as (x, y), the weight weight0XY of mode0 on the fourth unit may be represented by formula (24):

$$\text{weight0}XY = \qquad (24)$$
$$\frac{\text{weight0}RT - \text{weight0}LT}{M-1}x + \frac{\text{weight0}LB - \text{weight0}LT}{N-1}y + \text{weight0}LB$$

It should be noted that in formulas (20), (21) and (24), (M−1) or (N−1) is the denominator. In the field of video encoding and decoding, M and N are usually the integer power of 2, such as 4, 8, 16, 32, etc. At this time, dividing by M or N may be processed by right shift, which is friendly to hardware. In some alternative implementations, the denominator (M−1) in formulas (20), (21) and (24) may be replaced with M, and (N−1) may be replaced with N. That is, the coordinates of the left-bottom corner position in FIG. 13A may be replaced by (0, N), and the coordinates of the right-top corner position may be understood as (M, 0), so as to make the calculation simple. At this time, it may be understood that the points at the left-bottom corner position and the right-top corner position are not on the whole pixel.

In some embodiments, when the granularity of the calculation of weights is a sub-block, portion or pixel, an appropriate sub-block, portion, or pixel may be selected, such that the denominator in the formula for the change rate is an integer power of 2, which is not limited in the present disclosure.

As another specific example, continuing with reference to FIG. 13B, when the first change rate is represented as formula (22), the second change rate is represented as formula (23), and the fourth unit is represented as (x, y), the weight weight0XY of mode0 on the fourth unit may be as represented by formula (25):

$$\text{weight0}XY = \frac{2(\text{weight0}MU - \text{weight0}LT)}{M}x \qquad (25)$$
$$+ \frac{2(\text{weight0}LM - \text{weight0}LT)}{N}y + \text{weight0}LB$$

It should be noted that the maximum value of the weight calculated by the formulas (24) or (25) cannot exceed 1. If the calculated weight is greater than 1, the value should be clipped to 1. In addition, for each unit, the weight weight1XY of mode1 is 1 minus weight0XY, that is, weight1XY=1−weight0XY.

In operation 450, the intra prediction value of the current block is determined based on the first weights, the second weights and the fourth weights.

That is, the intra prediction value of the current block may be determined based on the weights of the at least two prediction modes on the units (for example, sub-blocks, portions, or pixels, etc.) of the current block. Exemplarily, for each unit, the intra prediction value is the sum of the product of the intra prediction value of each mode on the unit and the weight of the each mode on the unit.

Continuing with reference to the example in FIG. 13A to FIG. 13B, for FIG. 13A and FIG. 13B, the prediction value predXY at (x, y) may be represented as the following formula (26):

$$predXY = pred0XY * \text{weight}0XY + pred1XY * \text{weight}1XY \quad (26)$$

In some embodiments, for example, in actual implementation, in order to avoid the use of decimals, a method of first amplifying and then normalizing may be used. For example, the weights may be scaled up by 8 times. In order to achieve a rounding-like effect, an offset value may be added, and the final predicted value may be shifted to the right by 3 bits.

Therefore, in the embodiments of the present disclosure, after determining the weights of at least two prediction modes on at least two units (for example, sub-blocks, or portions, or pixels, etc.) of the current block, change rates of weights in a certain direction (for example, vertical direction or horizontal direction) may be further determined based on the weights on the at least two units, and weights on other units of the current block may be further determined in a smooth transition manner based on the change rates to determine the intra prediction value of the current block. Since in the embodiments of the present disclosure, the respective weights of at least two prediction modes on different units of the current block can be determined, different weights can be set for different points of the current block, thereby contributing to more accurate determination of intra prediction value of the current block and further improving compression efficiency.

The solutions of the embodiments of the present disclosure can be applied to scenario with complex textures, such as scenarios with some distorted lines or with uneven surfaces, etc. That is to say, in these scenarios with more complex textures, the embodiments of the present disclosure do not need to encode more residuals or partition smaller blocks to make the textures in a single block simple, but directly perform intra prediction, so that the embodiments of the present disclosure can help to make complex prediction under the condition of using as few flag bits as possible, thus contributing to improving compression efficiency.

The embodiments of the present disclosure further provide a method for intra prediction. In the method, the template of the current block is partitioned into sub-templates, and a prediction mode is determined based on costs of the candidate modes on the sub-templates of the current block, and then the intra prediction value of the current frame is determined based on the prediction mode. In the embodiments of the present disclosure, since the prediction mode is determined based on the sub-template, the cost of the prediction mode on the sub-template is less, that is, the prediction mode has a good effect locally, thereby contributing to more accurate intra prediction and further improving the compression efficiency.

Figure 14:
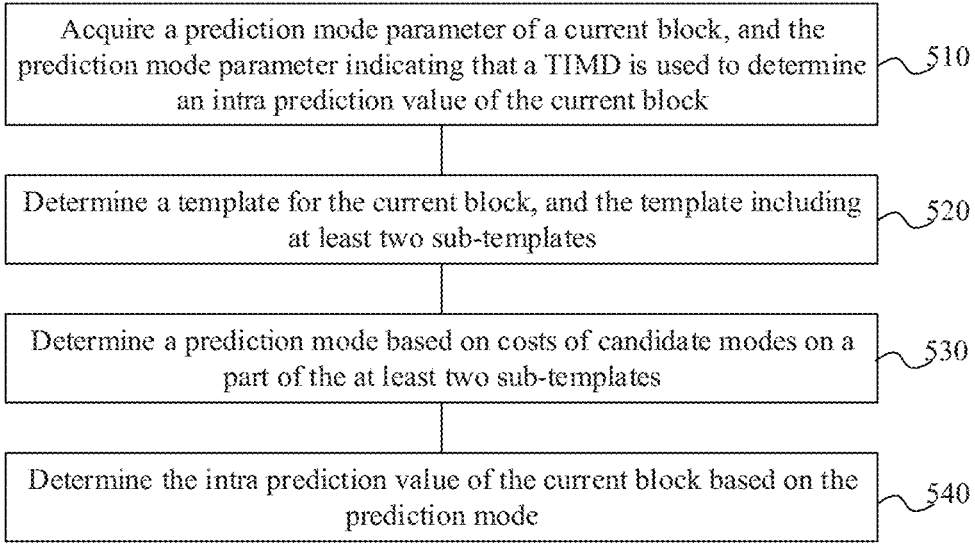
FIG. 14 is a schematic flowchart of another method for intra prediction according to an embodiment of the present disclosure.

FIG. 14 illustrates a schematic flowchart of another method 500 for intra prediction according to an embodiment of the present disclosure. The method 500 may be applied to an encoder such as encoder 100 in FIG. 1 or to a decoder such as decoder 200 in FIG. 2. Further, the method 500 may be applied to the intra prediction unit 106 in the encoder 100 or the intra prediction unit 204 in the decoder 200. As illustrated in FIG. 14, the method 500 includes operations 510 to 540.

In operation 510, a prediction mode parameter of a current block is acquired. The prediction mode parameter indicates that a TIMD is used to determine an intra prediction value of the current block.

In operation 520, a template for the current block is determined, and the template includes at least two sub-templates.

More specifically, operations 510 and 520 can refer to the description for the operations 310 and 320 in FIG. 3, which will not be repeated in the present disclosure.

In operation 530, a prediction mode is determined based on costs of candidate modes on a part of the at least two sub-templates.

Exemplarily, when the entire template of the current block is partitioned into at least two sub-templates, the part of sub-templates may be a part of the at least two sub-templates, such as one sub-template, two sub-templates, or more sub-templates, which will not be limited in the present disclosure.

Specifically, when the template of the current block is partitioned into multiple sub-templates, the correlation between the points close to each other in space is strong, while the correlation between the points far from each other is weak. The template partitioned into a top sub-template and a left sub-template (for example, FIG. 8A) is taken as an example. If some pixels are close to the top sub-template and far from the left sub-template, these points have strong correlation with the top sub-template, that is, the intra prediction mode that has good effect on the top sub-template is more suitable for these pixels. However, some intra prediction modes have a good effect on the top sub-template, and have a poor effect on the left template, which results in poor effect of these modes on the entire template, so these modes may be discarded in the prior art. However, in embodiments of the present disclosure, these intra prediction modes may be used when prediction mode is determined based on the costs of the candidate modes on part of sub-templates.

Exemplarily, some candidate modes may be tried respectively on the sub-templates of the current block. For example, a mode with the minimum cost on each sub-template is selected as the prediction mode.

In some alternative embodiments, the at least two prediction modes may also be determined based on the costs of the candidate modes on a part of the at least two sub-templates and the costs of the candidate modes on the template (i.e., the entire template of the current block). That is, the prediction mode determined by the embodiment of the present disclosure may include a mode that has a good effect on the sub-templates of the current block, and may further include a mode that has a good effect on the entire template of the current block. Specifically, the above related description for FIG. 10 and FIG. 10 may be referred.

In some alternative embodiments, a mode which has good effect (i.e., with a less cost) on a local template may not necessarily has good effect on the entire template, so limitations may be further set when selecting at least two prediction modes. For example, the costs of the at least two prediction modes on the entire template may not exceed a first value. The first value is a preset threshold value, or the first value is an integer multiple (for example, twice or other integer multiple) of a cost (for example, costMode0) of the mode (i.e., mode 0) (which has the minimum cost on the template) on the entire template, which is not limited in the present disclosure.

As a specific example, when mode0, mode1 and mode2 are the modes with the minimum costs on the entire template, the sub-template 1 and the sub-template 2 of the current block, respectively, the cost of mode1 or mode2 on the entire template may be further set to not exceed twice of costMode0.

In operation 540, the intra prediction value of the current block is determined based on the prediction mode.

In some embodiments, when there is one prediction mode, the intra prediction value of the current block may be calculated based on this prediction mode.

In some embodiments, when there are at least two prediction modes, weights of the at least two prediction modes on the current block may be respectively determined based on the respective costs of the at least two prediction modes on the sub-templates. Then, an intra prediction value of the current block may be determined based on the respective weights of the at least two prediction modes on the current block.

As a specific implementation, the at least two prediction modes have the same weight on each unit on the current block.

As another specific implementation, the at least two prediction modes have different weights on different units on the current block. Alternatively, the method 500 may further include partitioning the current block into at least two units. Then, the weights of the at least two prediction modes on the first unit are respectively determined based on the costs of the at least two prediction modes on the sub-templates. herein, the at least two units include the first unit. Thereafter, the intra prediction value of the current block may be determined based on the respective weights of the at least two prediction modes on the first unit.

That is, the weights of the at least two prediction modes on different units of the current block may be calculated based on the costs of the at least two prediction modes on the different sub-templates of the template. Alternatively, when determining respective weights of at least two prediction modes on the first unit based on the costs of the at least two prediction modes on the sub-templates, the sub-templates includes a sub-template closest to the first unit of the two sub-templates, for example, this sub-template may be neighbouring to the first unit. Specifically, the weights may be determined with reference to methods 300 or 400 above, which are not limited in the present disclosure.

Thus, in the embodiments of the present disclosure, the template of the current block is partitioned into sub-templates, and a prediction mode is determined based on costs of the candidate modes on the sub-templates of the current block, and then the intra prediction value of the current frame can be determined based on the prediction mode. Since the prediction mode is determined based on the sub-template, the cost of the prediction mode on the sub-template is less, that is, the prediction mode has a good effect locally, thereby contributing to more accurate intra prediction and further improving the compression efficiency.

Further, since in the embodiments of the present disclosure, the weights of at least two prediction modes on different units (such as sub-blocks, or portions, or pixels, etc.) of the current block can be determined, so that different weights can be set for different units of the current block, the embodiments of the present disclosure is helpful to more accurately determine the intra prediction value of the current block, thereby further improving the compression efficiency.

It should be noted that in the embodiments of the present disclosure, the method for intra prediction may be applied to both an encoder and a decoder, which is not limited in the present disclosure. Based on the method for intra prediction according to the embodiments of the present disclosure, a better prediction effect can be obtained at the encoder 100 to improve the encoding performance, and correspondingly, the video decoding recovery quality can be improved at the decoder 200 to improve the decoding performance. Specifically, when the encoder encodes or attempts to encode the TIMD and the decoder decodes the TIMD, the encoding process and the decoding process may use the same preset rules or operations, such as the above method 300, or method 400, or method 500, to calculate the prediction value of the TIMD mode. In other words, given the TIMD mode, the process of generating the prediction block by using the TIMD mode is the same at the encoding end and the decoding end.

The specific embodiments of the present disclosure have been described in detail with reference to the accompanying drawings, but the present disclosure is not limited to the specific details in the above implementations. Within the technical conception scope of the present disclosure, various simple modifications may be made to the technical solutions of the present disclosure, and these simple modifications all belong to the protection scope of the present disclosure. For example, respective specific technical features described in the above specific implementations may be combined in any suitable manner without contradiction, and various possible combinations are not further described in the present disclosure in order to avoid unnecessary repetition. For another example, any combination may be made between the various embodiments of the present disclosure, so long as it does not depart from the idea of the present disclosure, and it is likewise to be regarded as the contents of the present disclosure.

It should also be understood that in the various method embodiments of the present disclosure, the size of the sequence number of the above-mentioned processes does not mean the order of execution, and the execution order of respective processes should be determined by their functions and inherent logic, and should not be defined in any way by the implementation process of the embodiments of the present disclosure. It should be understood that these serial numbers are interchangeable where appropriate, so that the described embodiments of the present disclosure can be implemented in an order other than those illustrated or described.

Embodiments of the methods of the present disclosure are described in detail above with reference to FIG. 1 to FIG. 14 and embodiments of the apparatus of the present disclosure are described in detail below with reference to FIG. 15 and FIG. 16.

Figure 15:
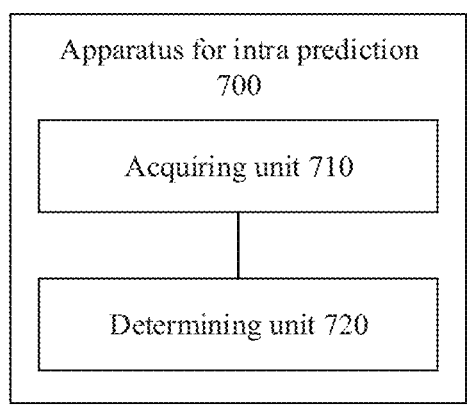
FIG. 15 is a schematic block diagram of an apparatus for intra prediction according to an embodiment of the present disclosure.

FIG. 15 is a schematic block diagram of an apparatus 700 for intra prediction according to an embodiment of the present disclosure. The apparatus may be an encoder such as encoder 100 in FIG. 1 or a decoder such as decoder 200 in FIG. 2. As illustrated in FIG. 15, the apparatus 700 may include an acquiring unit 710 and a determining unit 720.

The acquiring unit 710 is configured to acquire a prediction mode parameter of a current block. The prediction mode parameter indicates that a TIMD is used to determine an intra prediction value of the current block.

The determining unit 720 is configured to: determine first weights of at least two prediction modes on a first unit of the current block, respectively; and determine second weights of the at least two prediction modes on a second unit of the current block, respectively. Coordinates of the first unit and coordinates of the second unit are different in a first direction.

The determining unit 720 is further configured to determine first change rates of the at least two prediction modes in the first direction based on the first weights, the second weights, the coordinates of the first unit and the coordinates of the second unit.

The determining unit 720 is further configured to determine fourth weights of the at least two prediction modes on a fourth unit based on the first change rates and coordinates of the fourth unit.

The determining unit 720 is further configured to determine the intra prediction value of the current block based on the first weights, the second weights and the fourth weights.

In some alternative embodiments, the determining unit 720 is further configured to determine third weights of the at least two prediction modes on a third unit of the current block, respectively. The coordinates of the first unit and coordinates of the third unit are different in a second direction, and the second direction is perpendicular to the first direction.

The determining unit 720 is further configured to: determine second change rates of the at least two prediction modes in the second direction based on the first weights, the third weights, the coordinates of the first unit and the coordinates of the third unit; and determine the fourth weights based on the first change rates, the second change rates, and the coordinates of the fourth unit.

In some alternative embodiments, the first unit is located at a left-top corner position of the current block, the second unit is located at a left-bottom corner position of the current block, and the third unit is located at a right-top corner position of the current block.

In some alternative embodiments, the first unit is located at a left-top corner position of the current block, the second unit is located at a right-middle position of the current block, and the third unit is located at a middle-top position of the current block.

In some alternative embodiments, the at least two prediction modes are determined based on costs of candidate modes on a template of the current block, or based on costs of candidate modes on a part of sub-templates in a template.

In some alternative embodiments, in case that the at least two prediction modes are determined based on the costs of the candidate modes on the part of sub-templates in the template, costs of the at least two prediction modes on the template does not exceed a first value. The first value is a preset threshold value, or the first value is twice of a cost of a first prediction mode, and the first prediction mode is a mode with a minimum cost on the template.

In some alternative embodiments, units of the current block include sub-blocks of the current block, portions of the current block, or pixels of the current block.

In some alternative embodiments, the current block includes a CU or a PU.

It should be understood that apparatus embodiments and method embodiments may correspond to each other and similar descriptions can refer to method embodiments. To avoid repetition, the similar description will not be repeated in the present disclosure. Specifically, in the embodiment, the apparatus 700 for intra prediction may correspond to a corresponding perform entity for performing the method 400 of the embodiment of the present disclosure. The above and other operations and/or functions of the respective modules in the apparatus 700 for intra prediction are used for implementing the respective methods in FIG. 12 or the respective flows in the method in FIG. 12, which are not repeated in the present disclosure for the sake of brevity.

Apparatus and systems of embodiments of the present disclosure are described above from the perspective of functional modules in combination with the accompanying drawings. It should be understood that the functional modules may be implemented in hardware form, by instructions in software form, or by a combination of hardware and software units. In particular, various operation of the method embodiments in the embodiments of the present disclosure may be completed by the integrated logic circuit of the hardware in the processor and/or the instruction in the form of software, and the operations of the methods disclosed in combination with the embodiments of the present disclosure may be directly embodied as the execution of the hardware decoding processor or the combined execution of the hardware and software units in the decoding processor. Alternatively, the software units may be located in a storage medium mature in the art such as a Random Access Memory (RAM), a flash memory, a Read-Only Memory (ROM), a Programmable ROM (PROM), an Electrically Erasable PROM (EE PROM), a register, etc. The storage medium is located in the memory, and the processor reads the information in the memory and completes the operations in the method embodiments in combination with its hardware.

FIG. 16 is a schematic block diagram of an electronic device 800 according to an embodiment of the present disclosure.

As illustrated in FIG. 16, the electronic device 800 may include a memory 810 and a processor 820. The memory 810 is configured to store computer programs and transmit the computer programs to the processor 820. In other words, the processor 820 may invoke and run the computer programs from the memory 810 to implement the methods for intra prediction in embodiments of the present disclosure.

For example, the processor 820 may be configured to perform the operations in the method 300, 400 or 500 described above according to instructions in the computer programs.

In some embodiments of the present disclosure, the processor 820 may include, but is not limited to a general purpose processor, a Digital Signal Processor (DSP), an Application Specific Integrated Circuit (ASIC), a Field Programmable Gate Array (FPGA) or other programmable logic devices, discrete gate or transistor logic devices, discrete hardware components and so on.

In some embodiments of the present disclosure, the memory 33 includes, but is not limited to:
a Volatile memory and/or a nonvolatile memory. The nonvolatile memory may be a ROM, a PROM, an Erasable PROM (EPROM), an Electrically Erasable PROM (EEPROM), or a flash memory. The volatile memory may be a RAM, which serves as an external cache. By way of illustration, but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and Direct Rambus RAM (DR RAM).

In some embodiments of the present disclosure, the computer programs may be divided into one or more modules stored in the memory 810 and executed by the processor 820 to complete the encoding methods according to the present disclosure. The one or more modules may be a series of computer program instruction segments capable of performing specific functions. The instruction segments are used for describing the execution of the computer programs in the electronic device 800.

Alternatively, as illustrated in FIG. 16, the electronic device 800 may further include a transceiver 830.

The transceiver 830 may be connected to the processor 820 or the memory 810.

The processor 820 may control the transceiver 830 to communicate with other devices, and in particular may transmit information or data to other devices or receive information or data from other devices. The transceiver 830 may include a transmitter and a receiver. The transceiver 830 may further include antennas, and the number of antennas may be one or more.

It should be understood that the various components in the electronic device 800 are connected by a bus system. The bus system includes a power bus, a control bus and a status signal bus in addition to a data bus.

According to one aspect of the present disclosure, a communication device is provided. The communication device includes a processor and a memory. The memory is configured to store computer programs. The processor is configured to invoke and run the computer programs stored in the memory to cause the encoder to execute the method embodiments described above.

According to one aspect of the present disclosure, there is provided a computer storage medium having stored thereon a computer program that, when executed by a computer, causes the computer to perform the methods in the method embodiments described above. In other words, the embodiments of the present disclosure further provide a computer program product including instructions that, when executed by a computer, cause the computer to perform the methods in the method embodiments described above.

According to another aspect of the present disclosure, there is provided a computer program product or computer program including computer instructions stored in a computer-readable storage medium. The processor of a computer device reads the computer instruction from the computer-readable storage medium, executes the computer instruction, and causes the computer device to execute the method embodiments described above.

In other words, when the methods are implemented in software, they can be implemented in whole or in part in the form of a computer program product. The computer program product includes one or more computer instructions. When the computer program instructions are loaded and executed on a computer, the flows or functions according to embodiments of the present disclosure are generated in whole or in part. The computer may be a general purpose computer, a special purpose computer, a computer network, or other programmable device. The computer instructions may be stored in a computer readable storage medium, or may be transmitted from a computer readable storage medium to another computer readable storage medium. For example, the computer instructions may be transmitted from a Web site, a computer, a server, or a data center via wired (for example, coaxial cable, optical fiber, digital subscriber line (DSL)) or wireless (for example, infrared, wireless, microwave, etc.) to another Web site, computer, server, or data center. The computer readable storage medium may be any available medium accessible to a computer or a data storage device (such as a server, data center, etc) containing one or more available medium integration. The available medium may be a magnetic medium (for example, a floppy disk, a hard disk, a magnetic tape), an optical medium (for example, a digital video disc (DVD)), or a semiconductor medium (for example, a solid state disk (SSD)), etc.

It should be understood that in the embodiments of the present disclosure, "B corresponding to A" represents that B is associated with A. In one implementation, B may be determined based on A. But it should also be understood that determining B based on A does not mean determining B solely based on A, but may also be determined based on A and/or other information.

In the description of the present disclosure, unless otherwise specified, "at least one" refers to one or more, and "multiple" refers to two or more. In addition, "and/or" describes the association relationship of the associated objects, which indicates that there may be three kinds of relationships. For example, A and/or B may represent that: A exists alone, A and B exist simultaneously, and B exists alone. A and B may be singular or plural. The character "/" generally represents that there is an "or" relationship between associated objects. The "at least one of the following items" or its similar expression refers to any combination of these items, which includes any combination of singular or plural items. For example, "at least one of a, b, or c" may represent: a, b, c, a and b, a and c, b and c, or a, b and c, where a, b, and c may be singular or plural.

It should also be understood that the first, second, and other descriptions appearing in the embodiments of the present disclosure are only for illustrative purposes and to distinguish the objects of description, without any distinction in order, nor are they represent a special limitation on the number of devices in the embodiments of the present disclosure, and cannot constitute any limitation on the embodiments of the present disclosure.

It should also be understood that specific features, structures, or characteristics related to the embodiments in the specification are included in at least one embodiment of the present disclosure. In addition, these specific features, structures, or characteristics can be combined in any suitable way in one or more embodiments.

In addition, the terms "including" and "having" and any variations thereof are intended to cover non-exclusive inclusion, for example, a process, method, system, product, or server that includes a series of operations or units does not need to be limited to those clearly listed operations or units, but may include other operations or units that are not clearly listed or inherent to the process, method, product, or device.

Those of ordinary skill in the art will appreciate that the various example modules and algorithm operations described in combination with the embodiments disclosed herein may be implemented in electronic hardware or a combination of computer software and electronic hardware. Whether these functions are performed in hardware or software depends on the specific application and design constraints of the technology solutions. Skilled artisans may use different methods for each particular application to implement the described functionality, but such implementation should not be considered outside the scope of the present disclosure.

In several embodiments according to the present disclosure, it should be understood that the disclosed systems, apparatuses and methods may be implemented in other ways. For example, the above-described apparatus embodiments are only schematic, for example, the division of the modules is only a logical function division, and in practice, there may be another division mode, for example, multiple modules or components may be combined or integrated into another system, or some features may be ignored or not performed. On the other hand, the coupling, direct coupling or communication connection between each other illustrated or discussed may be indirect coupling or communication connection through some interface, device or module, and may be electrical, mechanical or other form.

The units illustrated as separate parts may or may not be physically separated, and the components displayed as units may or may not be physical modules. That is, they may be located in one place, or may be distributed over a plurality of network elements. Part or all of the modules may be selected according to the actual needs to achieve the purpose of the embodiments. For example, the functional units in various embodiments of the present disclosure may be integrated in one processing unit, various units may exist physically alone, or two or more units may be integrated in one unit.

The above contents are only the specific implementation of the present disclosure, but the scope of protection of the present disclosure is not limited thereto. Any technician familiar with this technical field can easily think of changes or substitutions within the technical scope disclosed in the present disclosure, which should be covered within the scope of protection of the present disclosure. Therefore, the scope of protection of the present disclosure shall be subject to the scope of protection of claims.

What is claimed is:

1. A method for intra prediction, applied to a decoder, comprising:
    acquiring a prediction mode parameter of a current block, the prediction mode parameter indicating that a template-based intra mode derivation (TIMD) is used to determine an intra prediction value of the current block;
    determining first weights of at least two prediction modes on a first unit of the current block, respectively, and determining second weights of the at least two prediction modes on a second unit of the current block, respectively; wherein coordinates of the first unit and coordinates of the second unit are different in a first direction;
    determining first change rates of the at least two prediction modes in the first direction based on the first weights, the second weights, the coordinates of the first unit and the coordinates of the second unit;
    determining fourth weights of the at least two prediction modes on a fourth unit based on the first change rates and coordinates of the fourth unit; and
    determining the intra prediction value of the current block based on the first weights, the second weights and the fourth weights.

2. The method of claim 1, further comprising:
    determining third weights of the at least two prediction modes on a third unit of the current block, respectively, wherein the coordinates of the first unit and coordinates of the third unit are different in a second direction, and the second direction is perpendicular to the first direction; and
    determining second change rates of the at least two prediction modes in the second direction based on the first weights, the third weights, the coordinates of the first unit and the coordinates of the third unit,
    wherein determining the fourth weights of the at least two prediction modes on the fourth unit based on the first change rates and the coordinates of the fourth unit comprises:
        determining the fourth weights based on the first change rates, the second change rates, and the coordinates of the fourth unit.

3. The method of claim 2, wherein the first unit is located at a left-top corner position of the current block, the second unit is located at a left-bottom corner position of the current block, and the third unit is located at a right-top corner position of the current block.

4. The method of claim 2, wherein the first unit is located at a left-top corner position of the current block, the second unit is located at a right-middle position of the current block, and the third unit is located at a middle-top position of the current block.

5. The method of claim 1, wherein the at least two prediction modes are determined based on costs of candidate modes on a template of the current block, or based on costs of candidate modes on a part of sub-templates in a template.

6. The method of claim 5, wherein in case that the at least two prediction modes are determined based on the costs of the candidate modes on the part of sub-templates in the template, costs of the at least two prediction modes on the template does not exceed a first value; the first value is a preset threshold value, or the first value is twice of a cost of a first prediction mode, and the first prediction mode is a mode with a minimum cost on the template.

7. The method of claim 1, wherein units of the current block comprise sub-blocks of the current block, portions of the current block, or pixels of the current block.

8. The method of claim 1, wherein the current block comprises a coding unit (CU) or a prediction unit (PU).

9. A method for intra prediction, applied to an encoder, comprising:
    acquiring a prediction mode parameter of a current block, the prediction mode parameter indicating that a template-based intra mode derivation (TIMD) is used to determine an intra prediction value of the current block;
    determining first weights of at least two prediction modes on a first unit of the current block, respectively, and determining second weights of the at least two prediction modes on a second unit of the current block, respectively; wherein coordinates of the first unit and coordinates of the second unit are different in a first direction;
    determining first change rates of the at least two prediction modes in the first direction based on the first weights, the second weights, the coordinates of the first unit and the coordinates of the second unit;
    determining fourth weights of the at least two prediction modes on a fourth unit based on the first change rates and coordinates of the fourth unit; and
    determining the intra prediction value of the current block based on the first weights, the second weights and the fourth weights.

10. The method of claim 9, further comprising:
    determining third weights of the at least two prediction modes on a third unit of the current block, respectively, wherein the coordinates of the first unit and coordinates of the third unit are different in a second direction, and the second direction is perpendicular to the first direction; and
    determining second change rates of the at least two prediction modes in the second direction based on the first weights, the third weights, the coordinates of the first unit and the coordinates of the third unit, wherein determining the fourth weights of the at least two prediction modes on the fourth unit based on the first change rates and the coordinates of the fourth unit comprises:
determining the fourth weights based on the first change rates, the second change rates, and the coordinates of the fourth unit.

11. The method of claim 10, wherein the first unit is located at a left-top corner position of the current block, the second unit is located at a left-bottom corner position of the current block, and the third unit is located at a right-top corner position of the current block.

12. The method of claim 10, wherein the first unit is located at a left-top corner position of the current block, the second unit is located at a right-middle position of the current block, and the third unit is located at a middle-top position of the current block.

13. A decoder, comprising:
a processor and a memory,
wherein the memory is configured to store computer programs, and
the processor is configured to:
acquire a prediction mode parameter of a current block, the prediction mode parameter indicating that a template-based intra mode derivation (TIMD) is used to determine an intra prediction value of the current block; and
determine first weights of at least two prediction modes on a first unit of the current block, respectively, and determine second weights of the at least two prediction modes on a second unit of the current block, respectively; wherein coordinates of the first unit and coordinates of the second unit are different in a first direction,
wherein the processor is further configured to determine first change rates of the at least two prediction modes in the first direction based on the first weights, the second weights, the coordinates of the first unit and the coordinates of the second unit;
wherein the processor is further configured to determine fourth weights of the at least two prediction modes on a fourth unit based on the first change rates and coordinates of the fourth unit; and
wherein the processor is further configured to determine the intra prediction value of the current block based on the first weights, the second weights and the fourth weights.

14. The decoder of claim 13, wherein the processor is further configured to:

determine third weights of the at least two prediction modes on a third unit of the current block, respectively, wherein the coordinates of the first unit and coordinates of the third unit are different in a second direction, and the second direction is perpendicular to the first direction; and
determine second change rates of the at least two prediction modes in the second direction based on the first weights, the third weights, the coordinates of the first unit and the coordinates of the third unit,
wherein the processor is further configured to:
determine the fourth weights based on the first change rates, the second change rates, and the coordinates of the fourth unit.

15. The decoder of claim 14, wherein the first unit is located at a left-top corner position of the current block, the second unit is located at a left-bottom corner position of the current block, and the third unit is located at a right-top corner position of the current block.

16. The decoder of claim 14, wherein the first unit is located at a left-top corner position of the current block, the second unit is located at a right-middle position of the current block, and the third unit is located at a middle-top position of the current block.

17. The decoder of claim 13, wherein the at least two prediction modes are determined based on costs of candidate modes on a template of the current block, or based on costs of candidate modes on a part of sub-templates in a template.

18. The decoder of claim 17, wherein in case that the at least two prediction modes are determined based on the costs of the candidate modes on the part of sub-templates in the template, costs of the at least two prediction modes on the template does not exceed a first value; the first value is a preset threshold value, or the first value is twice of a cost of a first prediction mode, and the first prediction mode is a mode with a minimum cost on the template.

19. The decoder of claim 13, wherein units of the current block comprise sub-blocks of the current block, portions of the current block, or pixels of the current block.

20. An encoder, comprising:
a processor and a memory,
wherein the memory is configured to store computer programs, and
the processor is configured to invoke and run the computer programs stored in the memory to cause the electronic device to perform the method of claim 9.

* * * * *